United States Patent
Toshchakov et al.

(10) Patent No.: US 12,271,447 B2
(45) Date of Patent: Apr. 8, 2025

(54) METHODS AND SERVERS FOR DETERMINING METRIC-SPECIFIC THRESHOLDS TO BE USED WITH A PLURALITY OF NESTED METRICS FOR BINARY CLASSIFICATION OF A DIGITAL OBJECT

(71) Applicant: YANDEX EUROPE AG, Lucerne (CH)

(72) Inventors: Aleksey Vasilevich Toshchakov, Vologda (RU); Mikhail Mikhailovich Nosovsky, Moscow (RU); Artem Vladimirovich Meshcheryakov, Shchelkovo (RU)

(73) Assignee: Y.E. Hub Armenia LLC, Yerevan (AM)

( * ) Notice: Subject to any disclaimer, the term of this patent is extended or adjusted under 35 U.S.C. 154(b) by 856 days.

(21) Appl. No.: 17/494,405

(22) Filed: Oct. 5, 2021

(65) Prior Publication Data

US 2022/0114402 A1     Apr. 14, 2022

(30) Foreign Application Priority Data

Oct. 9, 2020    (RU) .......................... RU2020133324

(51) Int. Cl.
*G06F 18/241* (2023.01)
*G06F 18/21* (2023.01)
(Continued)

(52) U.S. Cl.
CPC .......... *G06F 18/241* (2023.01); *G06F 18/217* (2023.01); *G06F 18/2431* (2023.01); *G06N 20/00* (2019.01)

(58) Field of Classification Search
None
See application file for complete search history.

(56) References Cited

U.S. PATENT DOCUMENTS 5,467,006 A    11/1995  Sims
7,519,562 B1   4/2009   Vander et al.
(Continued)

FOREIGN PATENT DOCUMENTS

CN    103853744 A    6/2014
RU    2378692 C2     1/2010
(Continued)

OTHER PUBLICATIONS

Wever, Marcel, Felix Mohr, and Eyke Hüllermeier. "Ensembles of evolved nested dichotomies for classification." In Proceedings of the Genetic and Evolutionary Computation Conference, pp. 561-568. 2018. (Year: 2018).*

(Continued)

*Primary Examiner* — Incent Gonzales
(74) *Attorney, Agent, or Firm* — BCF LLP

(57) ABSTRACT

Method and server for determining a target combination of metric-specific thresholds to be used with a plurality of nested metrics for performing binary classification of a digital object are disclosed. The method includes acquiring object-specific validation datasets, and a plurality of nested metrics thereon, thereby generating a plurality of prediction values. During a first iteration, the server compares predictions values against a first combination of metric-specific thresholds and generates first precision parameters and first recall parameters for the first iteration. During a second iteration, the server adjusts one of the first combination thereby generating a second combination, compares the predictions values against the second combination, and generates second precision parameters and second recall parameters for the second iteration. The method includes selecting, by the one of the first combination and the second combination as the target combination of metric-specific thresholds.

18 Claims, 7 Drawing Sheets

(51) Int. Cl.
    *G06F 18/2431*    (2023.01)
    *G06N 20/00*    (2019.01)

(56) References Cited

U.S. PATENT DOCUMENTS

| | | | |
|---|---|---|---|
| 7,610,276 | B2 | 10/2009 | Yomtobian |
| 7,827,054 | B2 | 11/2010 | Campbell et al. |
| 7,877,800 | B1 | 1/2011 | Satish et al. |
| 8,578,462 | B2 | 11/2013 | Petrovic |
| 8,661,299 | B1 | 2/2014 | Ip |
| 8,966,631 | B2 | 2/2015 | El-Moussa et al. |
| 9,047,628 | B2 | 6/2015 | Mislove et al. |
| 9,092,510 | B1 | 7/2015 | Stets et al. |
| 9,098,459 | B2 | 8/2015 | Davis et al. |
| 9,183,387 | B1 | 11/2015 | Altman et al. |
| 9,241,010 | B1 | 1/2016 | Bennett et al. |
| 9,349,134 | B1 | 5/2016 | Adams et al. |
| 9,479,516 | B2 | 10/2016 | Mote et al. |
| 9,652,354 | B2 | 5/2017 | Filimonov et al. |
| 9,672,242 | B2 | 6/2017 | Jung et al. |
| 9,846,896 | B2 | 12/2017 | Shah et al. |
| 9,866,566 | B2 | 1/2018 | Dulkin et al. |
| 9,870,596 | B2 | 1/2018 | Babinowich et al. |
| 10,009,358 | B1 | 6/2018 | Xie et al. |
| 10,084,816 | B2 | 9/2018 | Zhang et al. |
| 10,089,660 | B2 | 10/2018 | Luan et al. |
| 10,218,733 | B1 | 2/2019 | Amidon et al. |
| 10,348,767 | B1 | 7/2019 | Lee et al. |
| 10,362,057 | B1 | 7/2019 | Wu |
| 10,565,372 | B1 | 2/2020 | Stickle et al. |
| 2004/0260922 | A1 | 12/2004 | Goodman et al. |
| 2005/0262026 | A1 | 11/2005 | Watkins et al. |
| 2008/0162475 | A1 | 7/2008 | Meggs et al. |
| 2008/0172271 | A1 | 7/2008 | Wee et al. |
| 2008/0301090 | A1 | 12/2008 | Sadagopan et al. |
| 2008/0301811 | A1 | 12/2008 | Jung |
| 2009/0049547 | A1 | 2/2009 | Fan |
| 2009/0083184 | A1 | 3/2009 | Eisen et al. |
| 2009/0249480 | A1 | 10/2009 | Osipkov et al. |
| 2010/0262688 | A1 | 10/2010 | Hussain et al. |
| 2011/0055104 | A1 | 3/2011 | Sun et al. |
| 2011/0208714 | A1 | 8/2011 | Soukal et al. |
| 2012/0233692 | A1 | 10/2012 | Oh et al. |
| 2013/0246302 | A1 | 9/2013 | Black |
| 2013/0332468 | A1 | 12/2013 | Hardas et al. |
| 2014/0114877 | A1 | 4/2014 | Montano |
| 2014/0214570 | A1 | 7/2014 | Smolev et al. |
| 2014/0258169 | A1 | 9/2014 | Wong et al. |
| 2015/0095417 | A1 | 4/2015 | Chetuparambil et al. |
| 2015/0205862 | A1 | 7/2015 | Campagne et al. |
| 2015/0264073 | A1 | 9/2015 | Tavakoli et al. |
| 2015/0326674 | A1 | 11/2015 | Kruglick et al. |
| 2015/0332353 | A1 | 11/2015 | Chauhan |
| 2015/0341383 | A1 | 11/2015 | Reddy et al. |
| 2016/0065600 | A1 | 3/2016 | Lee et al. |
| 2016/0196566 | A1 | 7/2016 | Murali et al. |
| 2016/0259742 | A1 | 9/2016 | Faulkner et al. |
| 2016/0294775 | A1 | 10/2016 | Mahadik et al. |
| 2016/0321711 | A1 | 11/2016 | Wouhaybi et al. |
| 2017/0171186 | A1 | 6/2017 | Purushothaman et al. |
| 2017/0220971 | A1 | 8/2017 | Giammaria et al. |
| 2017/0221111 | A1 | 8/2017 | Salehi et al. |
| 2017/0230229 | A1 | 8/2017 | Sasturkar et al. |
| 2017/0272458 | A1 | 9/2017 | Muddu et al. |
| 2017/0288955 | A1 | 10/2017 | Yin |
| 2018/0048658 | A1 | 2/2018 | Hittel et al. |
| 2018/0114261 | A1 | 4/2018 | Jayachandran |
| 2018/0124095 | A1 | 5/2018 | Hamdi |
| 2018/0196684 | A1 | 7/2018 | Pengfei et al. |
| 2018/0218295 | A1 | 8/2018 | Hasija et al. |
| 2018/0278647 | A1 | 9/2018 | Gabaev et al. |
| 2018/0357683 | A1 | 12/2018 | Pickover et al. |
| 2019/0034986 | A1 | 1/2019 | Robinson et al. |
| 2019/0064752 | A1 | 2/2019 | Marwah et al. |
| 2019/0379700 | A1 | 12/2019 | Canzanese et al. |
| 2020/0012981 | A1 | 1/2020 | Davison et al. |
| 2020/0098018 | A1 | 3/2020 | Narula |
| 2020/0311309 | A1 | 10/2020 | Dawer et al. |
| 2020/0342006 | A1 | 10/2020 | Rossi et al. |
| 2021/0271727 | A1 | 9/2021 | Fan et al. |

FOREIGN PATENT DOCUMENTS

| | | |
|---|---|---|
| WO | 2018222797 A1 | 12/2018 |
| WO | 2019013771 A1 | 1/2019 |

OTHER PUBLICATIONS

Yang, Gen, Sébastien Destercke, and Marie-Hélène Masson. "Cautious classification with nested dichotomies and imprecise probabilities." Soft Computing 21 (2017): 7447-7462. (Year: 2017).*

Kosmopoulos, Aris, Ioannis Partalas, Eric Gaussier, Georgios Paliouras, and Ion Androutsopoulos. "Evaluation measures for hierarchical classification: a unified view and novel approaches." Data Mining and Knowledge Discovery 29 (2015): 820-865. (Year: 2015).*

Notice of Allowance with regard to the counterpart U.S. Appl. No. 16/911,503 mailed Feb. 24, 2022.

Craw, "Using Word2Vec to Classify Review Keywords", article published on Oct. 13, 2017, retrieved on Jul. 6, 2022, pp. 1-17.

Office Action issued on May 4, 2022 in respect of the related U.S. Appl. No. 16/869,828.

"Search Engine Click Spam Detection Based on Bipartite Graph Propagation" http://www.thuir.cn/group/~YQLiu/publications/wsdm2014.pdf, published in WSDM '14 Proceedings of the 7th ACM international conference on Web search and data mining on Feb. 24, 2014, retrieved on Oct. 9, 2019.

Walgampaya "Cracking the Smart ClickBot", Conference: 13th IEEE International Symposium on Web Systems Evolution, WSE 2011, Williamsburg, VA, USA, Sep. 30, 2011 Cite this publication, DOI: 10.1109/WSE.2011.6081830 , retrieved on Oct. 9, 2019.

Yafeng "Positive Unlabeled Learning for Deceptive Reviews Detection", Wuhan University, published in Proceedings of the 2014 Conference on Empirical Methods in Natural Language Processing (EMNLP), retrieved on Oct. 9, 2019.

Jespersen, "Online reviews: How to figure out which are real and which are fake", Article published on Apr. 26, 2019.

McCabe, "9 Ways to Spot a Fake Review (+How Amazon is Fighting Back)", Article published on Mar. 1, 2019.

Notice of Allowance dated Mar. 8, 2023 received in respect of a related U.S. Appl. No. 16/869,828.

Russian Search Report dated Oct. 29, 2021 issued in respect of the related Russian Patent Application No. RU 2019126743.

* cited by examiner

METHODS AND SERVERS FOR DETERMINING METRIC-SPECIFIC THRESHOLDS TO BE USED WITH A PLURALITY OF NESTED METRICS FOR BINARY CLASSIFICATION OF A DIGITAL OBJECT

CROSS-REFERENCE

The present application claims priority to Russian Patent Application No. 2020133324, entitled "Methods and Servers for Determining Metric-Specific Thresholds to Be Used with a Plurality of Nested Metrics for Binary Classification of a Digital Object", filed Oct. 9, 2020, the entirety of which is incorporated herein by reference.

FIELD

The present technology relates to systems and methods for binary classification of digital objects. In particular, the present technology is directed to methods and servers for determining a combination of metric-specific thresholds to be used with a plurality of nested metrics for performing binary classification of a digital object.

BACKGROUND

Machine learning algorithms (MLAs) are used to address multiple needs in computer-implemented technologies. Typically, MLAs are used for generating a prediction based on data provided thereto. Some MLAs are referred to as "classifiers" and are generally configured to classify objects into one or more classes. In other words, some MLAs are configured for solving the problem of identifying to which of a set of categories (sub-populations) a new observation belongs, these MLAs having been trained on the basis of a training set of data containing observations (or instances) whose category membership is known.

A resulting predicted class may be used as additional information about a given object for providing better online electronic services to consumers. For example, information obtained from object classification can be used by search engine services (e.g., document classification), content recommendation services (e.g., content classification), email services (e.g., email classification), e-market services (e.g., user classification), and the like.

For example, a classifier can be trained on a training dataset associated with an object and which comprises information associated with the object and a ground-truth class of the object. The classifier learns what information about the object is more likely indicative of the ground-truth class of training objects. The classifier is then used to determine a predicted class of an in-use object based on information available for that in-use object.

Incorrect classification of objects can introduce bias during further object processing and is generally detrimental to the quality of online services requiring such classification.

SUMMARY

Embodiments of the present technology have been developed based on developers' appreciation of at least one technical problem associated with the prior art approaches to object classification.

In one broad aspect of the present technology, there is provided a server configured to execute a plurality of computer-implemented algorithms referred to as a "classification engine" and which is broadly configured to perform binary classification of "digital objects". In the context of the present technology, digital objects may refer to entities associated with one or more online services such as, but limited to, search engine services, content recommendation services, e-commerce, and email services. The nature of a digital object depends on inter alia specific implementations of the present technology.

The classification engine comprises a plurality of "Machine Learning Algorithms" (MLAs) configured to perform class prediction of a digital object based on past object events associated therewith. It can be said that the plurality of MLAs are prediction models that model a plurality of metrics and which are applied onto data representative of past object events of a given digital object in order to determine the likelihood of the object belonging to a given class.

In at least one broad aspect of the present technology, the plurality of metrics employed by the classification engine are configured to use particular subsets of the past object events. It should be noted that some types of object events may be related in a particular manner.

More particularly, some types of object events may have a "nested" relationship amongst each other. It can be said that a second type of object events is nested into a first type of object events if the second type of object events can occur only if the first type of object events has occurred—for example, object events indicative of clicks (second type) by a given user on search engine results can only occur if queries (first type) are submitted by the given user. It can also be said that a second type of object events is nested into a first type of object events when the second type of object events is a subset of the first type of object events—for example, object events indicative of long clicks (second type) are a subset of object events indicative of clicks (first type).

In at least some embodiments of the present technology, it can be said that the plurality of metrics employed by the classification engine are "nested", in a sense that object events used by a first one of the plurality of metrics for making predictions are nested into object events used by a second one of the plurality of metrics for making its own predictions.

The classification engine comprises a computer-implemented algorithm configured to apply a "target combination of metric-specific thresholds" onto predictions made by the plurality of nested metrics for performing binary classification of a digital object. In one non-limiting example of the present technology, where three nested metrics are employed for generating three (respective) predictions, based on respective subsets of past object events, indicative of a likelihood of the digital object belonging to a first class, the classification engine may apply a target combination of three metric-specific thresholds, each of which correspond to a respective nested metric amongst the three nested metrics. In some embodiments, in response to at least one of the plurality of predictions being above the respective one from the target combination of metric-specific thresholds, the classification engine may be configured to determine that the digital object belongs to a first class. In some embodiments, in response to none of the plurality of predictions being above the respective one from the target combination of metric-specific thresholds, the classification engine may be configured to determine that the digital object belongs to an other class.

In at least one broad aspect of the present technology, there is provided a server configured to select the target combination of metric-specific thresholds for the plurality of nested metrics amongst a plurality of candidate combinations of metric-specific thresholds. The server may be configured to perform an iterative validation process for selecting the target combination of metric-specific thresholds amongst the plurality of candidate combinations of metric-specific thresholds. In some embodiments, the server may be configured to use an object-specific validation dataset in order to obtain validation data regarding classification performance of the plurality of nested metrics with different combinations of metric-specific thresholds. For example, the classification performance of the plurality of nested metrics with different combinations of metric-specific thresholds may be measured in terms of precision, recall, accuracy, and the like. In some embodiments, the server may be configured to generate a current candidate combination of metric-specific thresholds (to be used during a current iteration of the iterative validation process) based on a previous candidate combination of metric-specific thresholds (used during a previous iteration of the iterative validation process).

In a first broad aspect of the present technology, there is provided a method of determining a target combination of metric-specific thresholds to be used with a plurality of nested metrics for performing binary classification of a digital object into a first class or a second class. The object is associated with past object events an indication of which is stored in a storage. The method is executable by a server configured to access the storage. The method comprises acquiring, by the server, a plurality of object-specific validation datasets. A given one of the plurality of object-specific validation datasets comprises an indication of a plurality of past object events associated with a respective validation object and a ground-truth class of the respective validation object being one of the first class and the second class. The method comprises applying, by the server, a plurality of nested metrics onto the plurality of object-specific validation datasets, thereby generating a plurality of prediction values. A given prediction value is indicative of a respective probability of the respective validation object belonging to one of the first class and the second class. The method comprises during a first iteration comparing, by the server, the plurality of predictions values against respective ones from a first combination of metric-specific thresholds for determining predicted classes of the respective validation objects for the first iteration. The method comprises during a first iteration generating, by the server, first precision parameters and first recall parameters for the plurality of nested metrics for the first iteration by comparing the ground-truth classes against the respective predicted classes of respective validation objects of the first iteration. The method comprises during a second iteration adjusting, by the server, one of the first combination of metric-specific thresholds thereby generating a second combination of metric-specific thresholds. The method comprises during a second iteration comparing, by the server, the plurality of predictions values against respective ones from the second combination of metric-specific thresholds for determining predicted classes of the respective validation objects for the second iteration. The method comprises during a second iteration generating, by the server, second precision parameters and second recall parameters for the plurality of nested metrics for the second iteration by comparing the ground-truth classes against the respective predicted classes of respective validation objects of the second iteration. The method comprises selecting, by the server, one of the first combination of metric-specific thresholds and the second combination of metric-specific thresholds as the target combination of metric-specific thresholds by comparing at least one of (i) the first precision parameters and the second precision parameters against a precision threshold, and (ii) the first recall parameters and the second recall parameters against a recall threshold. The target combination of metric-specific thresholds is to be used with the plurality of nested metrics in an in-use mode for performing binary classification of the digital object, such that in response to an in-use predicted value of at least one of the plurality of nested metrics for the digital object being above a respective one of the target combination of metric-specific thresholds, determining the digital object to be of the first class.

In some embodiments of the method, the method further comprises performing, by the server, a plurality of iterations until at least one of (i) precision parameters for a given iteration are above the precision threshold, and (ii) recall parameters for the given iteration are above the recall threshold, and selecting, by the server, a given combination of metric-specific thresholds from the given iteration as the target combination of metric-specific thresholds.

In some embodiments of the method, the method further comprises, during the in-use mode acquiring, by the server, an object-specific dataset comprising an indication of a plurality of past object events associated with the object. The method comprises during the in-use mode, applying, by the server, a plurality of nested metrics onto the object-specific dataset, thereby generating one or more prediction values indicative of a respective probability of the object belonging to one of the first class and the second class. The method comprises during the in-use mode, comparing, by the server, the one or more prediction values against the respective ones from the target combination of metric-specific thresholds. The method comprises during the in-use mode, in response to at least one of the one or more prediction values being above the respective one from the target combination of metric-specific thresholds, determining, by the server, the object to be of the first class. The method comprises during the in-use mode, in response to none of the one or more prediction values being above the respective one from the target combination of metric-specific thresholds, determining, by the server, the object to be of the second class.

In some embodiments of the method, a first metric from the plurality of nested metrics is based on a first type of object events, and a second metric from the plurality of nested metrics is based on a second type of object events. The second type of object events occurs only if the first type of object events have occurred.

In some embodiments of the method, the second type of object events is a subset of the first type of object events.

In some embodiments of the method, the target combination of metric-specific thresholds is selected simultaneously for the plurality of nested metrics during a single iteration.

In some embodiments of the method, the object is a given email and the first class is spam and the second class is non-spam.

In some embodiments of the method, the object is a given user of an e-market platform and the first class is a fraudulent class and the second class is a non-fraudulent class.

In some embodiments of the method, the object is a given document and the first class is a relevant class and the second class is a non-relevant class.

In a second broad aspect of the present technology, there is provided a server for determining a target combination of metric-specific thresholds to be used with a plurality of nested metrics for performing binary classification of a digital object into a first class or a second class. The object is associated with past object events an indication of which is stored in a storage. The server is configured to access the storage. The server is configured to acquire a plurality of object-specific validation datasets. A given one of the plurality of object-specific validation datasets comprises an indication of a plurality of past object events associated with a respective validation object and a ground-truth class of the respective validation object being one of the first class and the second class. The server is configured to apply a plurality of nested metrics onto the plurality of object-specific validation datasets, thereby generating a plurality of prediction values. A given prediction value is indicative of a respective probability of the respective validation object belonging to one of the first class and the second class. The server is configured to during a first iteration compare the plurality of predictions values against respective ones from a first combination of metric-specific thresholds for determining predicted classes of the respective validation objects for the first iteration. The server is configured to during a first iteration generate first precision parameters and first recall parameters for the plurality of nested metrics for the first iteration by comparing the ground-truth classes against the respective predicted classes of respective validation objects of the first iteration. The server is configured to during a second iteration adjust one of the first combination of metric-specific thresholds thereby generating a second combination of metric-specific thresholds. The server is configured to during a second iteration compare the plurality of predictions values against respective ones from the second combination of metric-specific thresholds for determining predicted classes of the respective validation objects for the second iteration. The server is configured to during a second iteration generate second precision parameters and second recall parameters for the plurality of nested metrics for the second iteration by comparing the ground-truth classes against the respective predicted classes of respective validation objects of the second iteration. The server is configured to select one of the first combination of metric-specific thresholds and the second combination of metric-specific thresholds as the target combination of metric-specific thresholds by comparing at least one of (i) the first precision parameters and the second precision parameters against a precision threshold, and (ii) the first recall parameters and the second recall parameters against a recall threshold. The target combination of metric-specific thresholds is to be used with the plurality of nested metrics in an in-use mode for performing binary classification of the digital object, such that in response to an in-use predicted value of at least one of the plurality of nested metrics for the digital object being above a respective one of the target combination of metric-specific thresholds, determining the digital object to be of the first class.

In some embodiments of the server, the server is further configured to perform a plurality of iterations until at least one of (i) precision parameters for a given iteration are above the precision threshold, and (ii) recall parameters for the given iteration are above the recall threshold, and select a given combination of metric-specific thresholds from the given iteration as the target combination of metric-specific thresholds.

In some embodiments of the server, the server is further configured to during the in-use mode acquire an object-specific dataset comprising an indication of a plurality of past object events associated with the object. The server is further configured to during the in-use mode apply a plurality of nested metrics onto the object-specific dataset, thereby generating one or more prediction values indicative of a respective probability of the object belonging to one of the first class and the second class. The server is further configured to during the in-use mode compare the one or more prediction values against the respective ones from the target combination of metric-specific thresholds. The server is further configured to during the in-use mode in response to at least one of the one or more prediction values being above the respective one from the target combination of metric-specific thresholds, determine the object to be of the first class. The server is further configured to during the in-use mode in response to none of the one or more prediction values being above the respective one from the target combination of metric-specific thresholds, determine the object to be of the second class.

In some embodiments of the server, a first metric from the plurality of nested metrics is based on a first type of object events, and a second metric from the plurality of nested metrics is based on a second type of object events. The second type of object events occurs only if the first type of object events has occurred.

In some embodiments of the server, the second type of object events is a subset of the first type of object events.

In some embodiments of the server, the target combination of metric-specific thresholds is selected simultaneously for the plurality of nested metrics during a single iteration.

In some embodiments of the server, the object is a given email and the first class is spam and the second class is non-spam.

In some embodiments of the server, the object is a given user of an e-market platform and the first class is a fraudulent class and the second class is a non-fraudulent class.

In some embodiments of the server, the object is a given document and the first class is a relevant class and the second class is a non-relevant class.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
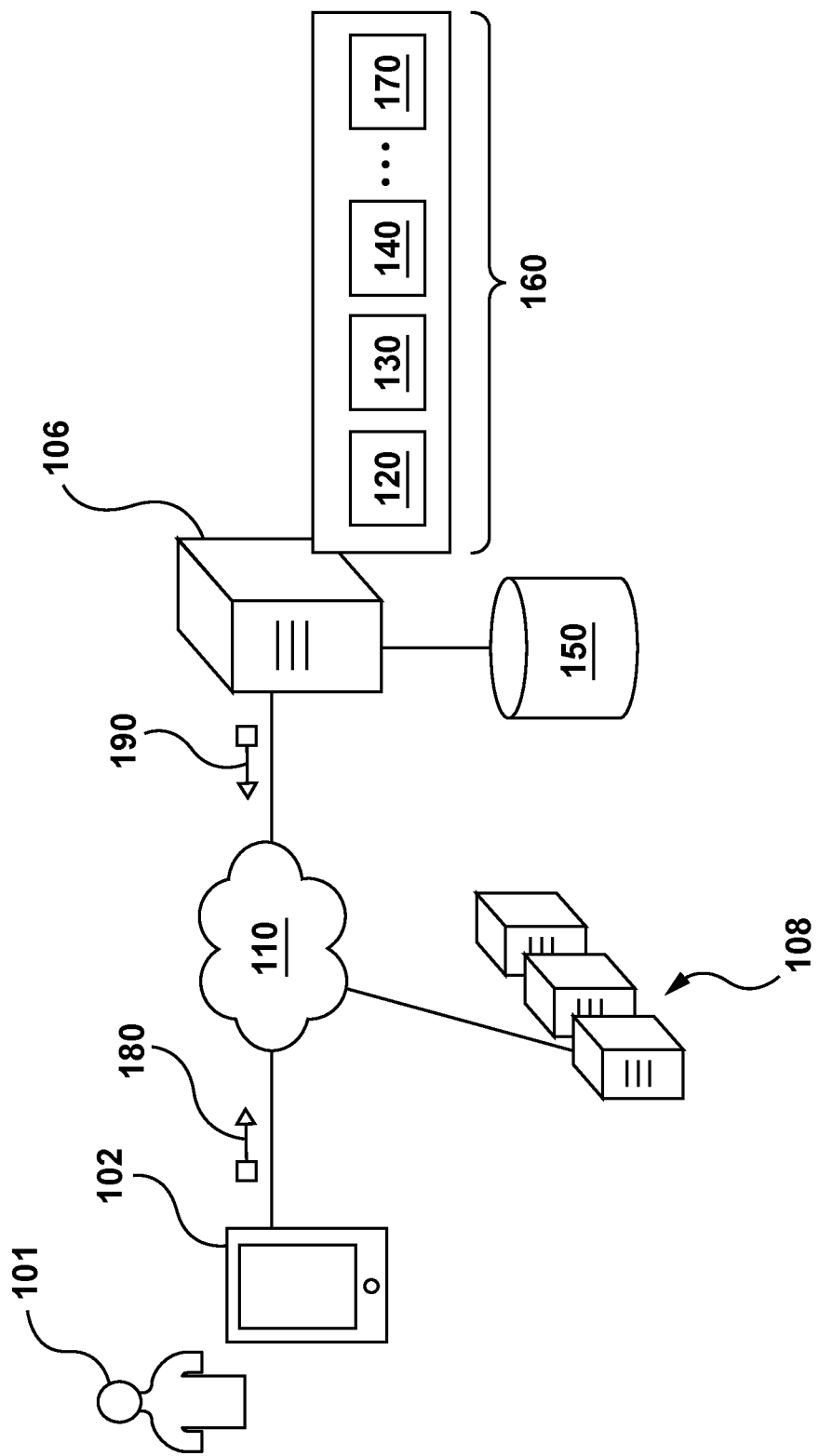
FIG. 1 is a schematic illustration of a system in accordance to at least some non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology.

In the illustrated example, the system 100 may be employed for providing one or more online services to a given user. To that end, the system 100 comprises inter alia an electronic device 102 associated with the user 101, a server 106, a plurality of resource servers 108, and a database system 150.

In one non-limiting example, the system 100 may be employed to provide search engine services. In this example, the user 101 may submit a given query via the electronic device 102 to the server 106 which, in response, is configured to provide search results to the user 101. The server 106 generates these search results based on information that has been retrieved from, for example, the plurality of resource servers 108 and stored in the database system 150. These search results provided by the system 100 may be relevant to the submitted query. It can be said that the server 106 may be configured to host a search engine 120.

As it will become apparent from the description herein further below, in addition to (or instead of) providing the search engine services, other online services may be provided to the user 101 such as a content recommendation services, an email service, e-commerce, and the like. For example, the server 106 may be configured host one or more of a plurality of online services 160 comprising the search engine 120, an e-commerce platform 130, and an email platform 140.

In the context of the present technology, the system 100 providing one or more online services is configured to perform binary classification of "digital objects" associated with the one or more online services. The nature of digital objects, and the purpose of its classification for different online services will be described in greater details herein further below.

Electronic Device

As mentioned above, the system 100 comprises the electronic device 102 associated with the user 101. As such, the electronic device 102, or simply "device" 102 can sometimes be referred to as a "client device", "end user device" or "client electronic device". It should be noted that the fact that the electronic device 102 is associated with the user 101 does not need to suggest or imply any mode of operation—such as a need to log in, a need to be registered, or the like.

In the context of the present specification, unless provided expressly otherwise, "electronic device" or "device" is any computer hardware that is capable of running a software appropriate to the relevant task at hand. Thus, some non-limiting examples of the device 102 include personal computers (desktops, laptops, netbooks, etc.), smartphones, tablets and the like. The device 102 comprises hardware and/or software and/or firmware (or a combination thereof), as is known in the art, to execute a given browser application (not depicted).

Generally speaking, the purpose of the given browser application is to enable the user 101 to access one or more web resources. How the given browser application is implemented is not particularly limited. One example of the given browser application that is executable by the device 102 may be embodied in a Yandex™ browser. For example, the user 101 may use the given browser application to (i) navigate to a given search engine website, and (ii) submit a query in response to which (s)he is to be provided with relevant search results. In another example, the user 101 may use the given browser application to (i) navigate to an e-commerce website, and (ii) buy and/or sell a product or a service. In a further example, the user 101 may use the given browser application to (i) navigate to an email website, and (ii) access her email account for appreciating emails associated with her account.

The device 102 is configured to generate a request 180 for communicating with the server 106. The request 180 may take form of one or more data packets comprising information indicative of, in one example, the query submitted by the user 101. The device 102 is also configured to receive a response 190 from the server 106. The response 190 may take form of one or more data packets comprising information indicative of, in one example, search results that are relevant to the submitted query and computer-readable instructions for displaying by the given browser application to the user 101 these search results.

Communication Network

The system 100 comprises a communication network 110. In one non-limiting example, the communication network 110 may be implemented as the Internet. In other non-limiting examples, the communication network 110 may be implemented differently, such as any wide-area communication network, local-area communication network, a private communication network and the like. In fact, how the communication network 110 is implemented is not limiting and will depend on inter alia how other components of the system 100 are implemented.

The purpose of the communication network 110 is to communicatively couple at least some of the components of the system 100 such as the device 102, the plurality of resource servers 108 and the server 106. For example, this means that the plurality of resource servers 108 is accessible via the communication network 110 by the device 102. In another example, this means that the plurality of resource servers 108 is accessible via the communication network 110 by the server 106. In a further example, this means that the server 106 is accessible via the communication network 110 by the device 102.

The communication network 110 may be used in order to transmit data packets amongst the device 102, the plurality of resource servers 108 and the server 106. For example, the communication network 110 may be used to transmit the request 180 from the device 102 to the server 106. In another example, the communication network 110 may be used to transmit the response 190 from the server 106 to the device 102.

Plurality of Resource Servers

As mentioned above, the plurality of resource servers 108 can be accessed via the communication network 110. The plurality of resource servers 108 may be implemented as conventional computer servers. In a non-limiting example of an embodiment of the present technology, a given one of the plurality of resource servers 108 may be implemented as a Dell™ PowerEdge™ Server running the Microsoft™ Windows Server™ operating system. The given one of the plurality of resource servers 108 may also be implemented in any other suitable hardware and/or software and/or firmware or a combination thereof.

The plurality of resource servers 108 are configured to host (web) resources that can be accessed by the device 102 and/or by the server 106. Which type of resources the plurality of resource servers 108 is hosting is not limiting. However, in some embodiments of the present technology, the resources may comprise digital documents, or simply "documents", that are representative of web pages.

For example, the plurality of resource servers 108 may host web pages, which means that the plurality of resource servers 108 may store documents representative of web pages and which are accessible by the device 102 and/or by the server 106. A given document may be written in a mark-up language and may comprise inter alia (i) content of a respective web page and (ii) computer-readable instructions for displaying the respective web page (content thereof).

A given one of the plurality of resource servers 108 may be accessed by the device 102 in order to retrieve a given document stored on the given one of the plurality of resource servers 108. For example, the user 101 may enter a web address associated with a given web page in the given browser application of the device 102 and, in response, the device 102 may access a given resource server hosting the given web page in order to retrieve the document representative of the given web page for rendering the content of the web page via the given browser application.

A given one of the plurality of resource servers 108 may be accessed by the server 106 in order to retrieve a given document stored on the given one of the plurality of resource servers 108. The purpose for the server 106 accessing and retrieving documents from the plurality of resource servers 108 will be described in greater detail herein further below.

Database System

The server 106 is communicatively coupled to the database system 150. Generally speaking, the database system 150 is configured to acquire data from the server 106, store the data, and/or provide the data to the server 106 for further use.

In some embodiments, the database system 150 may be configured to store information associated with the one or more online services hosted by the server 106. For example, in a case where the server 106 hosts the search engine 120, the database system 150 may store information about previously performed searches by the search engine 120, information about previously submitted queries to the server 106, and about documents that have been provided by the search engine 120 of the server 106 as search results.

In this example, it is contemplated that the database system 150 may store query data associated with respective queries submitted to the search engine 120. Query data associated with a given query may be of different types and is not limiting. For example, the database system 150 may store query data for respective queries such as, but not limited to:

popularity of a given query;
frequency of submission of the given query;
number of clicks associated with the given query;
indications of other submitted queries associated with the given query;
indications of documents associated with the given query;
other statistical data associated with the given query;
search terms associated with the given query;
number of characters within the given query; and
other query-intrinsic characteristics of the given query.

In this example, the database system 150 may also store document data associated with respective documents. Document data associated with a given document may be of different types and is not limiting. For example, the database system 150 may store document data for respective documents such as, but not limited to:

popularity of a given document;
click-through-rate for the given document;
time-per-click associated with the given document;
indications of queries associated with the given document;
other statistical data associated with the given document;
text associated with the given document;
file size of the given document; and
other document-intrinsic characteristics of the given document.

In this example, the database system 150 may also store user data associated with respective users. User data associated with a given user may be of different types and is not limiting. For example, the database system 150 may store user data for respective users such as, but not limited to:

web session data;
submitted query data;
"click" history;
interaction data; and
user preferences.

In at least some embodiments of the present technology, it is contemplated that the database system 150 may be configured to store data associated with a given "entity" or "object" of a given online service. It can be said that the database system 150 may be configured to store "object-specific" data. It is contemplated that the server 106 may be configured to store data about various objects of a given online service on an object-specific basis, without departing from the scope of the present technology.

For example, in the case of the server 106 hosting the search engine 120, the database system 150 may be configured to store data associated with respective users thereof (first type of digital objects or entities associated with the server engine services). Therefore, in this example, the database system 150 may be configured to store user-specific data on a user-by-user basis. In another example, in the case of the server 106 hosting the search engine 120, the database system 150 may be configured to store data associated with respective digital documents that have been used as search results (second type of digital objects or entities associated with the server engine services). Therefore, in this example, the database system 150 may be configured to store document-specific data on a document-by-document basis.

In a further example, in the case of the server 106 hosting the email platform 140, the database system 150 may be configured to store data associated with respective users thereof (first type of digital objects or entities associated with the email service). Therefore, in this example, the database system 150 may be configured to store user-specific data on a user-by-user basis. In another example, in the case of the server 106 hosting the email platform 140, the database system 150 may be configured to store data associated with respective emails (second type of digital objects or entities associated with the email service). Therefore, in this example, the database system 150 may be configured to store email-specific data on an email-by-email basis.

Hence, it can be said that the database system 150 may be configured to store different object-specific data depending on inter alia types of online service(s) hosted by the server 106, and types of objects associated with those online service(s).

As it will become apparent from the description herein further below, the server 106 is configured to execute a plurality of computer-implemented algorithms herein further refer to as a "classification engine" 170 that is broadly configured to perform binary classification of digital objects from one or more online services provided by the server 106.

In at least some embodiments of the present technology, the database system 150 may be configured to store "labelled" object-specific data for validating performance of one or more classification algorithms disclosed herein. For example, labelled object-specific data for a given validation object may include label data indicative of "ground-truth" class of the given validation object. How label data is collected and/or generated and then stored in the database system 150 is not particularly limiting. In some cases, label data may be collected from human assessors that have been tasked with "labelling" respective validation objects.

What information can be included in object-specific data and in labelled object-specific data stored in the database system 150 will be described in greater details herein further below with reference to FIG. 2.

Server

The system 100 comprises the server 106 that may be implemented as a conventional computer server. In an example of an embodiment of the present technology, the server 106 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 106 is a single server. In alternative non-limiting embodiments of the present technology, the functionality of the server 106 may be distributed and may be implemented via multiple servers.

As illustrated on FIG. 1, the server 106 can be configured to host the plurality of online services 160. For example, the server 106 may host the search engine 120 for providing search engine services, an e-commerce platform 130 for providing e-commerce services, and an email platform 140 for providing email services. How the search engine 120, the e-commerce platform 130, and the email platform 140 may be implemented in at least some embodiments of the present technology will now be described.

In some embodiments, the server 106 may be under control and/or management of a search engine provider (not depicted) such as, for example, an operator of the Yandex™ search engine. As such, the server 106 may be configured to host the search engine 120 for performing one or more searches responsive to queries submitted by users of the search engine 120.

For example, the server 106 may receive the request 180 from device 102 indicative of the query submitted by the user 101. The server 106 may perform a search responsive to the submitted query for generating search results that are relevant to the submitted query. As a result, the server 106 may be configured to generate the response 190 indicative of the search results and may transmit the response 190 to the device 102 for display of the search results to the user 101 via the given browser application, for example.

The search results generated for the submitted query may take many forms. However, in one non-limiting example of the present technology, the search results generated by the server 106 may be indicative of documents that are relevant to the submitted query. How the server 106 is configured to determine and retrieve documents that are relevant to the submitted query will become apparent from the description herein.

The server 106 may also configured to execute a crawler application (not depicted). Broadly speaking, the crawler application may be used by the server 106 in order to "visit" resources accessible via the communication network 110 and to retrieve/download them for further use. For example, the crawler application may be used by the server 106 in order to access the plurality of resource servers 108 and to retrieve/download documents representative of web pages hosted by the plurality of resource servers 108.

It is contemplated that the crawler application may be periodically executable by the server 106 in order to retrieve/download documents that have been updated and/or became accessible over the communication network 110 since a previous execution of the crawler application.

In other embodiments, the server 106 may be under control and/or management of a e-market provider (not depicted) such as, for example, an operator of the Yandex-.Market™ e-commerce platform. As such, the server 106 may be configured to host the e-commerce platform 130 for offering one or more articles and/or services for purchase or sale by users of the e-commerce platform 130.

Generally speaking, the e-commerce platform refers to one or more computer-implemented algorithms that enable the server 106 to provide e-commerce services for the user 101 of the electronic device 102. For example, the user 101 may be a customer of the e-commerce platform 130. The user 101 may enter a URL associated with the e-commerce platform 130 in the command interface of the browser application and may access her account with the e-commerce platform 130.

It should be noted that the server 106 may be configured to collect information regarding the customers and products available on the e-commerce platform 130. In one example, the server 106 may be configured to collect customer-specific information regarding customer interactions with different products. In this example, the server 106 may collect for a given customer information regarding viewed products, clicked products, purchased products, recommended products, and the like. In another example, the server 106 may be configured to collect product-specific information regarding different products. In this example, the server 106 may be configured to collect for a given product information regarding views, clicks, purchases, purchasers, and the like.

In further embodiments, the server 106 may be under control and/or management of a email service provider (not depicted) such as, for example, an operator of the Yandex-.Mail™ email service. As such, the server 106 may be configured to host the email platform 140 for providing email services to users of the email platform 140.

Generally speaking, the email platform 140 refers to one or more computer-implemented algorithms that enable the server 106 to provide email services for the user 101 of the electronic device 102. For example, the user 101 may have an email account associated with the email platform 140. The user 101 may enter a URL associated with the email platform 140 in the command interface of the browser application and may access her email account with the email platform 140.

In some embodiments of the present technology in addition to, or instead of, the electronic device 104 may be configured to execute a device-side email application (not depicted) associated with the (server-side) platform 140. Broadly speaking, the purpose of the device-side email application is to enable the user 101 to: browse a list of emails (both unread and read), read emails, open attachments, compose new emails, reply to emails, forward emails, delete emails, manage junk emails, assign categories to emails, organize emails into folders, create and access an address book and the like.

Irrespective of whether the user 101 makes use of the browsing application and/or the device-side email application for accessing her email account, it is contemplated that the user 101 may be provided with an email interface (not depicted) for performing one or more actions on emails in her email account. The functionality of the email platform 150 will be described in greater details herein further below.

Generally speaking, the purpose of the email interface is to allow user interactivity between a given user of the platform 140 (such as the user 101, for example) and emails in her email account. In one non-limiting example, the email interface may comprise one or more bars, one or more menus, one or more buttons, and may also enable other functionalities for allowing user interactivity with emails. It should be noted that a variety of email interfaces may be envisioned in the context of the present technology.

For example, the email interface may comprise a side bar indicative of one or more email folders (pre-determined and/or personalized) associated with a given email account such as, but not limited to: "inbox" folder, "outbox" folder, "drafts" folder, "junk" or "spam" folder, "deleted" folder, and the like. In another example, the email interface may comprise one or more buttons for performing various actions on emails such as, but not limited to: a "compose" button for composing a new email, a "send" button for sending a given email, a "save" button for saving a current version of a given email, a "read" button for indicating that a given email has been read or viewed by a given user, a "unread" button for indicating that a given email is unread or unviewed by a given user, a "spam" or "junk" button for indicating that a given email is to be categorized as a spam email and/or for indicating that the given email is to be transferred/moved to the "spam" folder, a "deleted" button for indicating that a given email is to be deleted and/or that the given email is to be transferred/moved to the "deleted" folder, and the like. In yet another example, the email interface may allow for other types of user interactivity with emails such as, but not limited to, "drag and drop" functionality for a given user to be able to select a given email from a first folder and to transfer/move the given email into a second folder in a seamless manner.

In the context of the present technology, the server 106 is configured to host the classification engine 170. Broadly speaking, the classification engine 170 is configured to use data stored in association with a digital object of a given online service and perform binary classification of that digital object. For example, the server 106 may retrieve object-specific data for a digital object from the database system 150, and employ the classification engine 170 in order to determine whether the digital object belongs to a first class, or otherwise a second class.

As it will be discussed in greater details herein further below, the classification engine 170 comprises (i) a plurality of "nested" metrics configured to make predictions regarding the likelihood of a digital object belonging to the first class, (ii) a combination of metric-specific thresholds against which the respective predictions are compared in order to determine whether the digital object is of the first class. The server 106 is also configured to determine a given target combination of metric-specific thresholds amongst a plurality of candidate combinations of metric-specific thresholds to be used in combination with the plurality of nested metrics.

Figure 2:
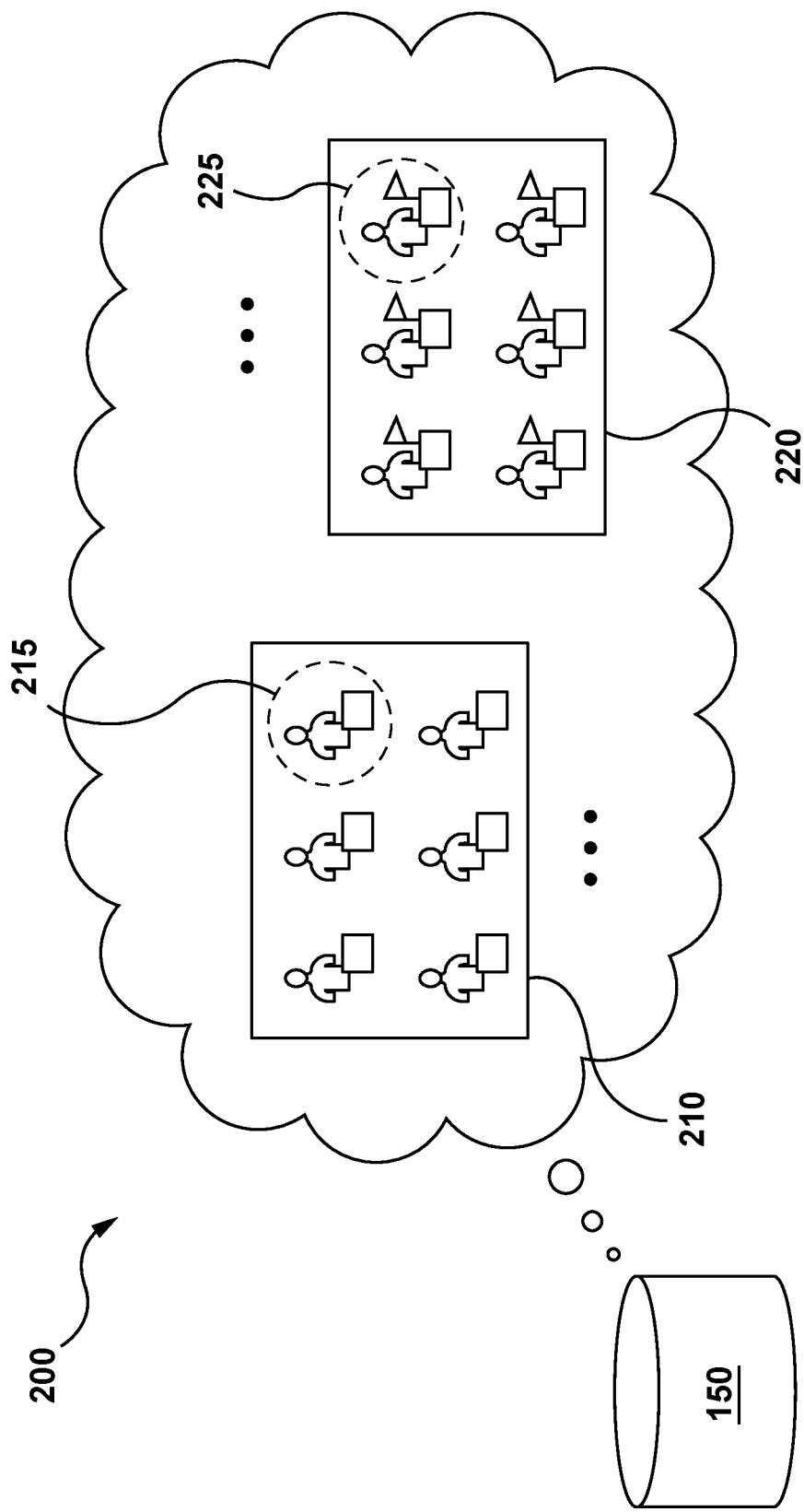
FIG. 2 depicts a representation of data stored by a database system of the system of FIG. 1, in accordance with non-limiting embodiments of the present technology.

Returning to the description of the database system 150, now with reference to FIG. 2, there is depicted a representation 200 of at least some data stored in the database system 150. As seen, the database system 150 is configured to store object-specific data 210 and object-specific validation data 220.

For sake of illustration only, let it be assumed that the objects in the illustrated example are users of the search engine 120. However, the types of objects may depend on inter alia various implementations of the present technology.

The object-specific data 210 is stored in the database system 150 on an object-by-object basis, or as seen in the illustrated non-limiting example, on a user-by-user basis. For example, the object-specific data 210 comprises a plurality of object-specific datasets (not numbered). The plurality of object-specific datasets comprises an object-specific dataset 215, also referred to as a "user-specific" dataset in the illustrated non-limiting example where the objects correspond to users of the search engine 120.

It should be noted that the object-specific dataset 215 comprises information for uniquely identifying the respective object. For example, the object-specific dataset 215 may be associated with an object "ID" (user ID, in this example) that uniquely identifies a specific object of the object-specific dataset 215. Also, the object-specific dataset 215 comprises information about the respective object collected by respective online service. In the illustrated example, the object-specific dataset 215 may comprise user interaction data about the specific user which has been gathered by the search engine 120. What information can be stored as part of the object-specific dataset 215 will be described in greater details herein further below with reference to FIG. 3.

As mentioned above, in addition to object-specific data 210, the database system 150 is also configured to store the object-specific validation data 220. For sake of illustration only, let it be assumed that the validation objects in the illustrated example are users of the search engine 120. Needless to say, similarly to the type of objects in the object-specific data 210, the type of validation objects may depend on inter alia various implementations of the present technology. However, it is contemplated that the type of objects in the object-specific data 210 may match the type of objects in the object-specific data 220.

The object-specific data 210 is stored in the database system 150 on an object-by-object basis, or as seen in the illustrated non-limiting example, on a user-by-user basis. For example, the object-specific validation data 220 comprises a plurality of object-specific validation datasets (not numbered). The plurality of object-specific validation datasets comprises an object-specific validation dataset 225, also referred to as a "user-specific" validation dataset in the illustrated non-limiting example where the validation objects correspond to users of the search engine 120.

It should be noted that the object-specific validation dataset 225 comprises information for uniquely identifying the respective object. For example, the object-specific validation dataset 225 may be associated with an object "ID"

(user ID, in this example) that uniquely identifies a specific validation object of the object-specific validation dataset 225. Also, the object-specific validation dataset 225 comprises information about the respective validation object collected by respective online service. In the illustrated example, the object-specific validation dataset 225 may comprise user interaction data about the specific user which has been gathered by the search engine 120.

However, in contrast to a given object-specific dataset from the object-specific data 210, the object-specific validation dataset 225 further comprises an indication of a "ground-truth" class of the respective validation object. As previously alluded to, the database system 150 may be configured to store label data indicative of the ground-truth classes of respective validation objects. In the non-limiting illustrated example, the object-specific validation dataset 225 (user-specific validation dataset) may comprise information regarding a ground-truth class of the respective validation object (respective validation user)—such as whether the respective validation user is a fraudulent or otherwise non-fraudulent user of the search engine 120, for example.

Needless to say, in addition to the type of objects and validation objects depending on inter alia various implementations of the present technology, the types of binary classes also depend on inter alia various implementations of the present technology. For example, if the validation object is a given digital document of the search engine 120, the ground-truth class may be indicative of whether this digital document is relevant or non-relevant. In another example, if the validation object is a given product of the e-commerce platform 130, the ground-truth class may be indicative of whether this given product is counterfeited or non-counterfeited. In yet a further example, if the validation object is a given email of the email platform 140, the ground-truth class may be indicative of whether this given email is spam or non-spam.

As it will become apparent from the description herein further below, the server 106 is configured to use object-specific data 210 during an in-use phase of classification engine 170, while the object-specific validation data 220 is used during a validation phase of training the classification engine 170 for determining which candidate combination of metric-specific thresholds is to be selected as a given target combination of metric-specific thresholds. It can be said that, in some embodiments of the present technology, the server 106 may be configured to (i) perform a training phase of a plurality of MLAs (plurality of nested metrics) by employing the object-specific validation data 220, (ii) perform a validation phase for selecting a target combination of metric-specific thresholds by employing the object-specific validation data 220, and (iii) perform an in-use phase of the classification engine 170, comprising the so-trained plurality of MLAs and the so-selected target combination of metric-specific thresholds, for classifying one or more objects from the object-specific data 210.

How the server 106 is configured to perform a single iteration of binary classification (a single iteration of the in-use phase of the classification engine 170) of a given object from the object-specific data 210 will now be described in greater details.

Figure 3:
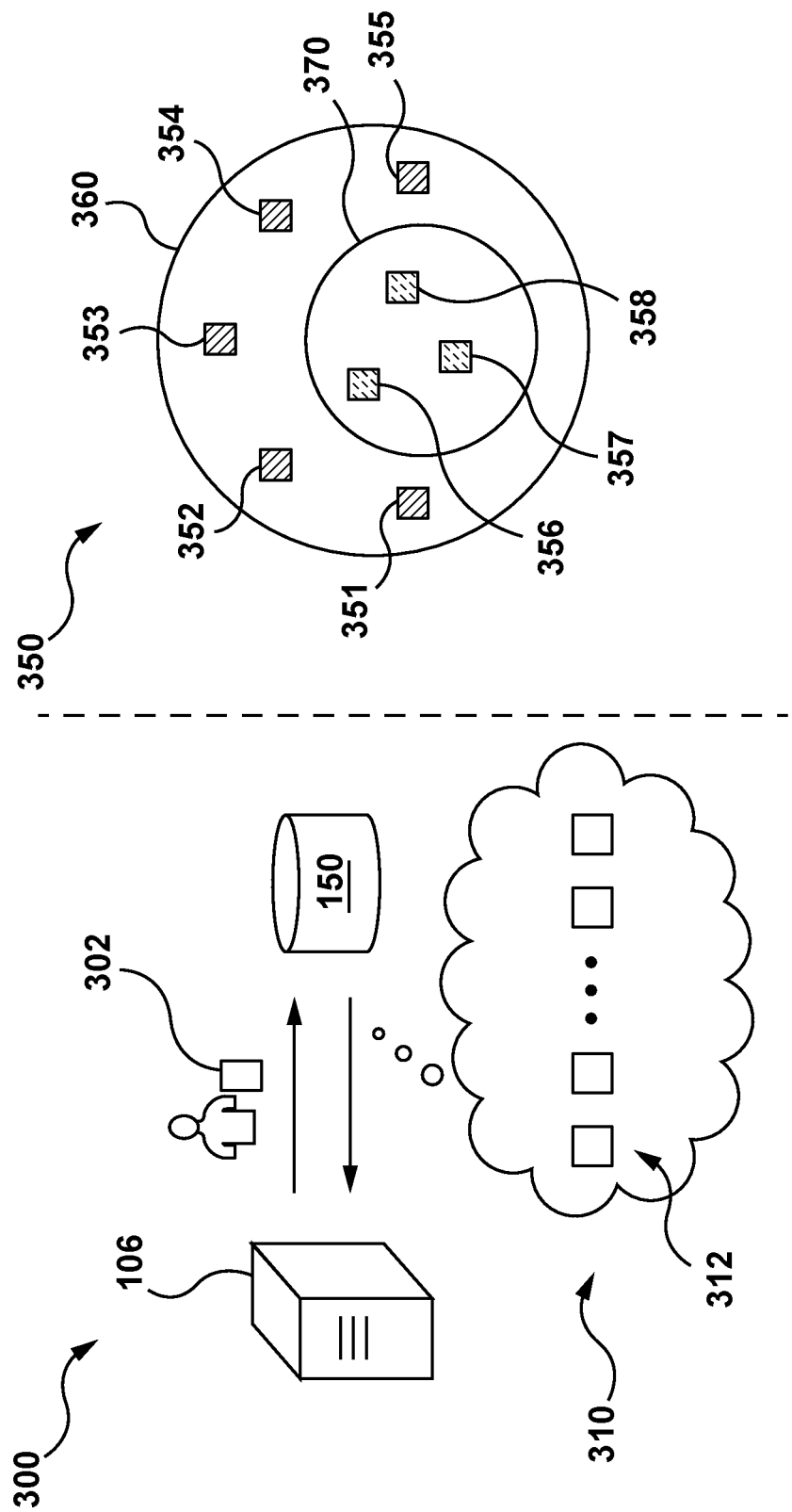
FIG. 3 depicts a representation of an object-specific dataset retrieved by a server of the system of FIG. 1, in accordance with non-limiting embodiments of the present technology.

With reference to FIG. 3, there is depicted (on a left side thereof) a representation 300 of a retrieval operation performed by the server 106 for a given object that is to be classified as being of a first or second class. The server 106 is configured to access the database system 150 and retrieve information associated with a given digital object to be classified. For example, the server 106 may be configured to transmit a request 302 containing an indication of an object ID to the database system 150 and, in response, the server 106 may be configured to acquire an object-specific dataset 310.

The object-specific dataset 310 comprises information about the respective object to be classified. More particularly, the object-specific dataset 310 comprises an indication of a plurality of past object events 312 associated with the respective object to be classified. As previously alluded to, object-specific data such as object events can be collected by the server 106 and stored in the database system 150. For example, in the non-limiting example where the object is a user of the search engine 120 (e.g., the user 101) the past object events 312 may comprise query submission events, view events, click events, long click events, etc. Hence, it can be said that past object events associated with a given object may comprise object-specific events of different types.

Needless to say, what types of past object events can be stored in association with a given object depends on inter alia on the type of online service to which the given object belongs, the type of the given object, as well as specific implementations of the present technology. However, it should be noted that some types of object events amongst the past object events 312 may be related amongst each other in a particular manner. More specifically, in at least some embodiments of the present technology, it is contemplated that some types of object events may have a "nested" relationship amongst each other.

To better illustrate this, let's assume that the past object events 312 for the given user of the search engine 120 comprises object events of a first type and of a second type, and that the first type of object events is "query submissions" and that the second type of object events are "search engine result clicks". In other words, some of the object events in the past object events 312 are indicative of the given user (the object in this example) having performed one or more query submissions, while other object events in the past object events 312 are indicative of the given user having clicked (selected) search engine results provided in response to those query submissions. In this example, it can be said that the second type of object events are, in a sense, "nested" into the first type of object events since the second type of object events can occur only if the first type of object events have occurred—that is, object events indicative of clicks on search engine results can only occur if respective queries have been submitted by the given user.

It can also be said that a given type of object events is "nested" into the first type of object events when the second type of object events is a subset of the first type of object events. To better illustrate this, reference will now be made to a representation 350 illustrating a set of object events 260 from the past object events 312. Let it be assumed that the set of object events 260 comprises "search engine result clicks". However, let it also be assumed that amongst all the search engine result clicks of the given user, some of them are "search engine result long clicks". For example, some of the search engine results that the given user clicked or selected may have been appreciated for a considerable period of time (hence, "long clicks").

For example, the set of object events 260 comprises object events 351, 352, 353, 354, 355, 356, 357, and 358 that are indicative of the user performing search engine result clicks. In the same example, let it be assumed that the object events 356, 357, and 358 are indicative of the user performing search engine result long clicks. In this example, it can be said that the set of object events 260 (comprising search engine result clicks) has a subset of object events 370 that comprises search engine result clicks that are long clicks. In this example, it can be said that the second type of object events (long clicks) is in a sense "nested" into the first type of object events (clicks) since the second type of object events is a subset of the first type of object events.

In summary, the server 106 may perform a retrieval operation for acquiring the object-specific dataset 310 for a given object and which comprises the past object events 312. Also, the past object events 312 comprise object events of different types, and that some object events have, in a sense, a "nested" relationship amongst each other and which nested relationship depends on the respective types of object events.

Figure 4:
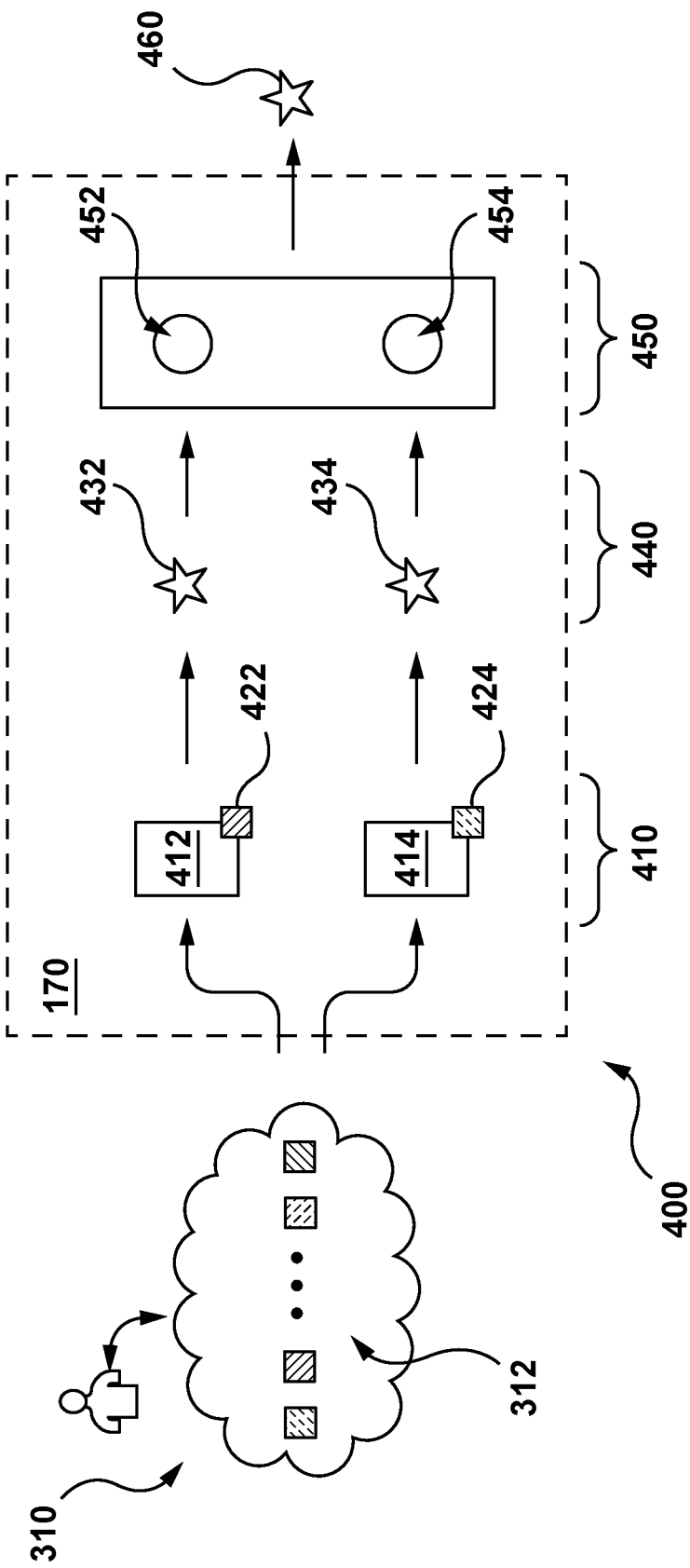
FIG. 4 depicts a representation of in-phase of a classification engine hosted by the server of the system of FIG. 1, in accordance with non-limiting embodiments of the present technology.

The server 106 is configured to use the object-specific dataset 310 for the given object for performing binary classification thereof. With reference to FIG. 4, there is depicted a representation 400 of a binary classification procedure performed by the classification engine 170 of the server 106. As seen, the server 106 is configured to input the object-specific dataset 310 into the classification engine 170.

Broadly speaking, the classification engine 170 comprises a plurality of nested metrics 410 that is configured to (i) receive as input at least some data from the object-specific dataset 310 and (ii) output a plurality of prediction values 440 for the digital object of the object-specific dataset 310.

As it will be described in greater details herein further below with reference to FIG. 5, a respective one of the plurality of nested metrics 410 can be implemented by the server 106 as a respective MLA configured to receive a respective subset of data from the object-specific dataset 310, and based on which, the respective one of the plurality of nested metrics 410 is configured to generate a respective prediction value indicative of a likelihood of the digital object of the object-specific dataset 310 to be of a first class (or of the second class).

For example, a first nested metric 412 is configured to use a subset 422 of the object-specific dataset 310 in order to generate a first prediction value 432 for the respective digital object and which is indicative of a likelihood of the respective digital object to be of the first class. In the same example, a second nested metric 414 is configured to use a subset 424 of the object-specific dataset 310 in order to generate a second prediction value 434 for the respective digital object and which is indicative of a likelihood of the respective digital object to be of the first class. How the plurality of nested metrics 410 are trained to make predictions and what data from the object-specific dataset 310 is included in the subset 422 and the subset 424 will be discussed in greater details herein further below with reference to FIG. 5.

As previously alluded to, the classification engine 170 is configured to compare the plurality of prediction values 440 against a target combination of metric-specific thresholds 450 in order to determine a predicted class 460 (being one of the first class and the second class) for the respective digital object. For example, the target combination of metric-specific thresholds 450 comprises a first target metric-specific threshold 452 (specific to the first nested metric 412) and a second target metric-specific threshold 454 (specific to the second nested metric 414).

It should be noted that, in response to at least one of the plurality of prediction values 440 being above the respective one from the target combination of metric-specific thresholds 450, the server 106 may be configured to determine that the respective object is of the first class—in other words, the server 106 determines the predicted class 460 for the digital object to be of the first class. By the same token, in response to none of the plurality of prediction values 440 being above the respective one from the target combination of metric-specific thresholds 450, the server 106 may be configured to determine that the respective object is of the second class— in other words, the server 106 determines that the predicted class 460 for the digital object is the second class.

In at least some embodiments of the present technology, it can be said that the classification engine 170 may comprise one or more computer-implemented algorithms herein referred to as "a threshold-based logic" that is configured to perform one or more logical operations based on the target combination of metric-specific thresholds 450 and the plurality of prediction values 440 in order to determine the predicted class 460 of the given digital object.

Developers of the present technology have realized that employing one combination of metric-specific thresholds, as opposed to an other combination of metric-specific thresholds, as part of the threefold-based logic 440 of the classification engine 170 may have an impact on the classification performance of the classification engine 170. For example, the classification performance of the classification engine 170 may be measured in terms of a variety of parameters comprising, but not limited to, accuracy, precision, and recall. In at least some embodiments of the present technology, developers of the present technology have devised methods and servers for selecting the target combination of metric-specific thresholds 450 amongst a plurality of candidate combinations of metric-specific thresholds such that each one of the plurality of nested metrics 410 has at least one of (i) a precision value that is above a minimum pre-determined precision value and (ii) a recall value that is above a minimum pre-determined recall value.

How the server 106 is configured to determine the target combination of metric-specific thresholds 450 will be described in greater details herein further below with reference to FIG. 6. However, how the plurality nested metrics 410 is trained to make predictions based on the object-specific dataset 310 will be described first.

As mentioned above, the server 106 is configured to implement the plurality of nested metrics 410 as a plurality of MLAs. Broadly speaking, a given MLA is first "built" (or trained) using training data and training targets. During a given training iteration, the MLA is inputted with a training input, and generates a respective prediction. The server 106 is then configured to, in a sense, "adjust" the MLA based on a comparison of the prediction against a respective training target for the training input. For example, the adjustment may be performed by the server 106 employing one or more machine learning techniques such as, but not limited to, a back-propagation technique. After a large number of training iterations, the MLA is thus "adjusted" in a manner that allows making predictions based on inputted data such that those predictions are close to the respective training targets.

To summarize, the implementation of a given one of the plurality of nested metrics 410 by the server 106 can be broadly categorized into two phases—a training phase and an in-use phase. First, the given MLA is trained during the training phase. Then, once the given MLA is built based on training data, the given MLA is employed by the classification engine 170 using in-use data during the in-use phase (in this example, the in-use phase of the given MLA occurs during the in-use phase of the classification engine 170).

Figure 5:
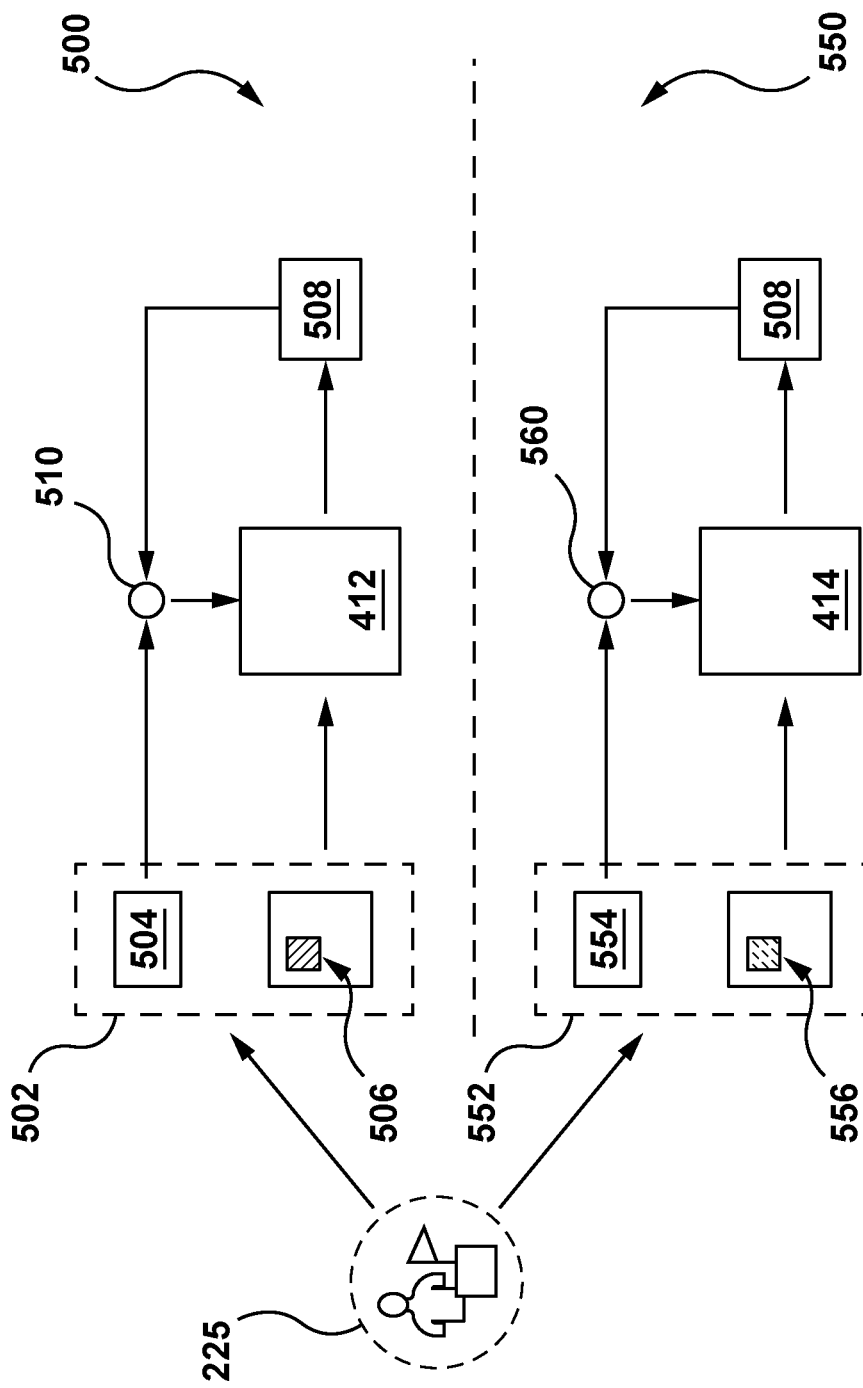
FIG. 5 depicts a representation of how a first nested metric and a second nested metric are trained by the server of the system of FIG. 1, in accordance with non-limiting embodiments of the present technology.

With reference to FIG. 5, there is depicted a representation 500 of a single training iteration of a first MLA (the first nested metric 412) and a representation 550 of a single training iteration of a second MLA (the second nested metric 414). The single training iteration of the first MLA and of the second MLA will now be discussed in turn.

The server 106 is configured to generate a training set 502 for the single training iteration of the first nested metric 412. The server 106 is configured to generate the training set 502 based on a given object-specific validation dataset stored in the database system 150. In the non-limiting illustrated example, let it be assumed that the server 106 generates the training set 502 based on the object-specific validation dataset 225.

The training set 502 comprises a target 504 indicative of the "ground-truth" class of the respective validation object. The training set 502 also comprises object-specific input 506 representative of at least some object events associated with the object-specific validation dataset 225.

It should be noted that the type of object events associated with the object-specific validation dataset 225 and which are to be used as the object-specific input 506 may be pre-determined by an operator of the server 106. For example, the operator may determine that the first nested metric 412 should predict the likelihood of a given object of being of the first class based on a given type of object events. As a result, the server 106 may be configured to determine a subset of object events from the object-specific validation dataset 225 that are of that given type of object events.

Let it be assumed that the given type of object events that is to be used as the object-specific input 506 is "clicks". As such, the server 106 may be configured to determine a subset of object events from the object-specific validation dataset 225 that are representative of "clicks" and use that subset as the object-specific input 506. Once the object-specific input 506 is inputted into the first MLA (the first nested metric 412 being trained), the first MLA is configured to generate a prediction value 508. The prediction value 508 is indicative of a likelihood of the respective validation object being of the first class and which is based on the given type of object events associated with the first MLA (e.g., based on object events representative of "clicks"). The server 106 is then configured to generate a comparison value 510 indicative of a difference between the target 504 and the prediction value 508.

For example, if the ground-truth class of the respective validation object is the first class, the target 504 may be "1". In the same example, if the ground-truth class of the respective validation object is the second class, the target 504 may be "0". In this example, the prediction value 508 may be a given value between "0" and "1". As such, it can be said that the comparison value 510 may be indicative of how similar or dissimilar the prediction value 508 is to the target 504. The server 106 uses the comparison value 510 in order to train or "adjust" the first MLA such that the first MLA generates prediction values that are as close to the respective targets.

After a large number of training iterations performed similarly to the single training iteration of the first MLA depicted in FIG. 5, the first nested metric 412 is configured to use object events of the respective type of object events associated with the first nested metric 412 (e.g., "clicks") for generating prediction values indicative of a likelihood of the respective objects of being of the first class.

In at least some embodiments of the present technology, a given nested metric may be configured to use input data comprising more than one respective type of object events without departing from the scope of the present technology.

The server 106 is configured to generate a training set 552 for the single training iteration of the second nested metric 414. The server 106 is configured to generate the training set 552 based on a given object-specific validation dataset stored in the database system 150. In the non-limiting illustrated example, let it be assumed that the server 106 generates the training set 552 based on the object-specific validation dataset 225. However, as it will become apparent from the description herein further below, training sets for training the first nested metric 412 and the second nested metric 414 may or may not be determined based on the same object-specific validation datasets.

The training set 552 comprises a target 554 indicative of the "ground-truth" class of the respective validation object. The training set 552 also comprises object-specific input 556 representative of at least some object events associated with the object-specific validation dataset 225.

It should be noted that the type of object events associated with the object-specific validation dataset 225 which are to be used as the object-specific input 556 may be pre-determined by an operator of the server 106. For example, the operator may determine that the second nested metric 414 should predict the likelihood of a given object of being of the first class based on an other given type of object events. As a result, the server 106 may be configured to determine a subset of object events from the object-specific validation dataset 225 that are of that other given type of object events.

However, it is important to note that the given type of object events to be used for training the first nested metric 412 and the other given type of object events to be used for training the second nested metric 414 have a particular relationship amongst each other—that is, the types of object events used by the plurality of nested metrics 410 are "nested" types of object events. In the example where the given type of object events used by the first nested metric 412 is "clicks", the other given type of object events to be used by the second nested metric 414 is nested into the "clicks" type of object events. Thus, metrics in the plurality of nested metrics can be said to be "nested" since they are based on types of object events that share a nested relationship amongst each other.

As such, let it be assumed that the other given type of object events that are used as the object-specific input 556 is "long clicks". As such, the server 106 may be configured to determine an other subset of object events from the object-specific validation dataset 225 that are representative of "long clicks" and use that other subset as the object-specific input 566. Once the object-specific input 556 is inputted into the second MLA (the first nested metric 412 being trained), the second MLA is configured to generate a prediction value 558. The prediction value 558 is indicative of a likelihood of the respective validation object being of the first class and which is based on the other given type of object events associated with the second MLA (e.g., based on object events representative of "long clicks"). The server 106 is then configured to generate a comparison value 560 indicative of a difference between the target 554 and the prediction value 558.

It can be said that the comparison value 560 may be indicative of how similar or dissimilar the prediction value 558 is to the target 554. The server 106 uses the comparison value 560 in order to train or "adjust" the second MLA such that the second MLA generates prediction values that are as close to the respective targets.

After a large number of training iterations performed similarly to the single training iteration of the second MLA depicted in FIG. 5, the second nested metric 414 is configured to use object events of the respective type of object events associated with the second nested metric 414 (e.g., "long clicks") for generating prediction values indicative of a likelihood of the respective objects of being of the first class.

As previously alluded to, training sets for training the first nested metric 412 and the second nested metric 414 may or may not be determined based on the same object-specific validation datasets. Indeed, in the non-limiting example illustrated on FIG. 5, it is assumed that the object-specific validation dataset 225 for the respective validation object comprises "click" events, and that amongst these "click" events, there are "long click" events. However, not each and every validation object may have events corresponding to nested event types of the plurality of nested metrics 410.

In some embodiments of the present technology a first given one and a second given one of the plurality of nested metrics may be trained independently from one another. In other embodiments, a first given one and a second given one of the plurality of nested metrics may be trained separately by the server 112.

In one example, the object-specific validation dataset 225 may have "click" events but not "long click" events. In this example, the object-specific validation dataset 225 may be used by the server 106 for training the first nested metric 412, since it includes object events of the respective type of object events associated with the first nested metric 412 (e.g., "click" type); however, the server 106 may not be able to use the object-specific validation dataset 225 for training the second nested metric 414, since it does not include object events of the respective type of object events associated with the second nested metric 414 (e.g., "long click" type). In such an example, the server 106 may be configured to use another object-specific validation dataset for training the second nested metric 414.

It should be noted however that if the server 106 determines that a given object-specific validation dataset comprises object events of the type of object events associated with the second nested metric 414, the server 106 may also determine that a given object-specific validation dataset comprises object events of the type of object events associated with the first nested metric 412, due to the nested relationship between types of object events used by the respective ones of the plurality of nested metrics 410.

As mentioned above, the server 106 is configured to select the target combination of metric-specific thresholds 450 amongst a plurality of candidate combinations of metric-specific thresholds. With reference to FIG. 6, there is depicted a representation 600 of an iterative validation process performed by the server 106 for selecting the target combination of metric-specific thresholds 450.

It is contemplated that the server 106 may be configured to acquire the object-specific validation data 220 comprising the plurality of object-specific validation datasets for performing the iterative validation process.

The server 106 may be configured to generate first prediction data 610 and second prediction data 620 based on the object-specific validation data 220 and the plurality of nested metrics 410. For example, as explained above, the server 106 may be configured to input at least a subset from the object-specific validation dataset 215 into the first nested metric 412 and at least an other subset form the object-specific validation dataset 215 into the second nested metric 414, in order to generate a first prediction value 612 and a second prediction value 614, respectively, for the validation object (and events associated therewith) associated with the object-specific validation dataset 215.

Similarly, the server 106 may be configured to use (i) the first nested metric 412 in order to generate a plurality of first prediction values 622 based on the plurality of object-specific validation datasets, and (ii) the second nested metric 414 in order to generate a plurality of second prediction values 622 based on the plurality of object-specific validation datasets. It is contemplated that, only some of the plurality of nested metrics 410 may be employed for a given validation object. For example, the server 106 may employ those of the plurality of nested metrics 410 for which the respective object-specific validation dataset comprises non-null respective object types.

It can be said that the server 106 may be configured to apply the plurality of nested metrics 410 onto the plurality of object-specific validation datasets, thereby generating a plurality of prediction values 625 (comprising the first prediction values 622 and the second prediction values 624) and where a given prediction value is indicative of a respective probability of the respective validation object (and events associated therewith) belonging to one of the first class and the second class.

Figure 6:
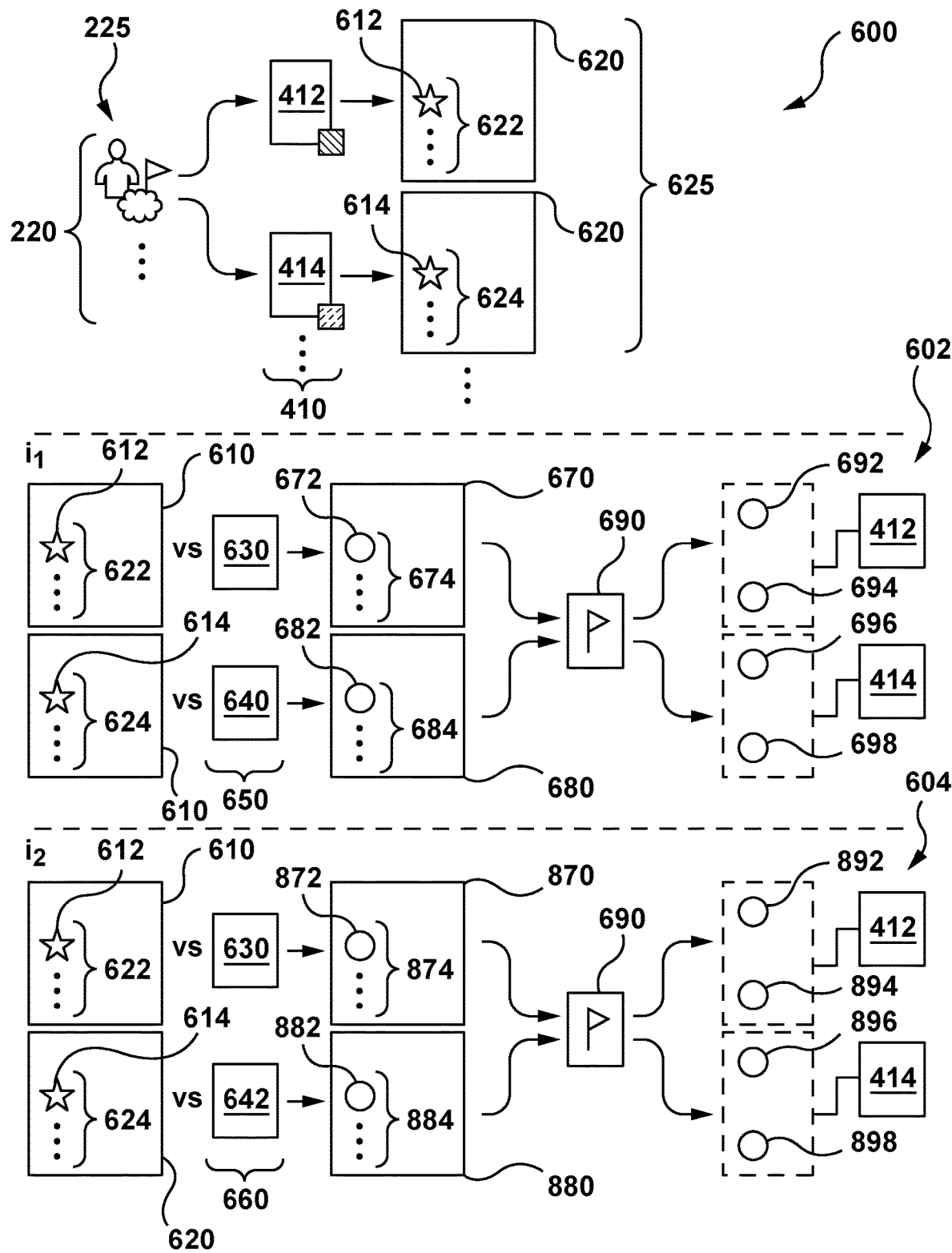
FIG. 6 depicts a representation of an iterative validation process performed by the server of the system of FIG. 1 for selecting a target combination of metric-specific thresholds, in accordance with non-limiting embodiments of the present technology.

In FIG. 6, there is also depicted a representation 602 of a first iteration of the iterative validation process and a representation 604 of a second iteration of the iterative validation process.

During the first iteration, the server 106 may be configured to employ a first candidate combination of metric-specific thresholds 650 for comparison against the plurality of prediction values 625. More particularly, during the first iteration, the server 106 may be configured to employ a first metric-specific threshold 630 from the first candidate combination of metric-specific thresholds 650 for comparison against the first prediction values 622 and a second metric-specific threshold 640 from the first candidate combination of metric-specific thresholds 650 for comparison against the second prediction values 624.

In some embodiments, it is contemplated that the first candidate combination of metric-specific thresholds 650 may be initialized by the server 106. For example, the server 106 may use a pre-determined initial candidate combination of metric-specific thresholds for executing the first iteration. As it will become apparent from the description herein further below, the pre-determined initial candidate combination of metric-specific thresholds may be used by the server for determining a plurality of candidate combinations of metric-specific thresholds by adjusting one or more metric-specific thresholds in a given candidate combination for generating a new given candidate combination.

For example, the server 106 may be configured to compare the first prediction value 612 for the validation object associated with the object-specific validation dataset 215 against the first metric-specific threshold 630, and in response, determine a predicted class 672. For example, if the first prediction value 612 is above the first metric-specific threshold 630, the server 106 may be configured to determine that the predicted class 672 is indicative of the first class otherwise, if the first prediction value 612 is below the first metric-specific threshold 630, the server 106 may be configured to determine that the predicted class 672 is indicative of the second class. Similarly, the server 106 may be configured to compare each one of the plurality of first prediction values 622 in order to generate a first plurality of predicted classes 674. It can be said that first predicted class data 670 is generated based on a comparison of the first prediction data 610 against the first metric-specific threshold 630.

In the same example, the server 106 may be configured to compare the second prediction value 614 for the validation object associated with the object-specific validation dataset

215 against the second metric-specific threshold 640, and in response, determine a predicted class 682. Similarly, the server 106 may be configured to compare each one of the plurality of second prediction values 624 in order to generate a second plurality of predicted classes 684. It can be said that a second predicted class data 680 is generated based on a comparison of the second prediction data 620 against the second metric-specific threshold 640.

The server 106 may be configured to compare the first predicted class data 670 and the second predicted class data 680 against label data 690 from the object-specific validation data 220.

On the one hand, the label data 690 comprises indications of ground-truth classes of respective validation objects. On the other hand, predicted classes in the first plurality of predicted classes 674 (predicted using the first nested metric 412) and in the second plurality of predicted classes 684 is associated with a respective validation object.

As such, the server 106 may be configured to perform a comparison of the first predicted class data 670 and of the second predicted class data 680 against the label data 690 for evaluating classification performance of the first nested metric 412 and the second nested metric 414 are used together in combination with the first metric-specific threshold 630 and the second metric-specific threshold 640 (the first candidate combination of metric-specific thresholds 650). For example, the server 106 may be configured to determine for the first iteration a first precision parameter 692 and a first recall parameter 694 for the first nested metric 412 and an other first precision parameter 696 and an other first recall parameter 698 for the second nested metric 414.

Broadly speaking a given precision parameter (also called positive predictive value) is the fraction of relevant instances among the retrieved instances, while recall parameter (also known as sensitivity) is the fraction of the total amount of relevant instances that were actually retrieved. In other words, the recall parameter is indicative of how many relevant instances were captured by the metric, while the precision parameter is indicative of how many of the captured instances were indeed classified in the appropriate class.

Therefore, it can be said that the server 106 may be configured to generate, during the first iteration, the first precision parameters (the first precision parameter 692 and the other first precision parameter 696) and the first recall parameters (the first recall parameter 694 and the other first recall parameter 698) for the plurality of nested metrics 410 by comparing the ground-truth classes from the object-specific validation data 220 against the respective predicted classes of respective validation objects when used in combination with the first combination of metric-specific thresholds 650.

It should be noted that the server 106 may be configured to store an indication of the first candidate combination of metric-specific thresholds 650 in association with the first precision parameter 692 and the first recall parameter 694 for the first nested metric 412 and in association with the other first precision parameter 696 and the other first recall parameter 698 for the second nested metric 414.

During the second iteration, the server 106 may be configured to employ a second candidate combination of metric-specific thresholds 660 for comparison against the plurality of prediction values 625.

As previously alluded to, it is contemplated that the server 106 may be configured to determine the second candidate combination of metric-specific thresholds 660 based on the first candidate combination of metric-specific thresholds 650. In one embodiment, the server 106 may be configured to adjust one of the first candidate combination 650 while keeping the rest of the first candidate combination 650 "unchanged".

As such, the server 106 may be configured to determine the second candidate combination of 660 by adjusting the second metric-specific threshold 640 from the first candidate combination 650. In this example, the second candidate combination 660 comprises the first metric-specific threshold 630 and an adjusted second metric-specific threshold 642 (based on the second metric-specific threshold 640).

In at least some embodiments of the present technology, the server 106 may be configured to apply an "adjustment algorithm" configured to control the direction (e.g., increasing or decreasing) and magnitude by which a given metric-specific threshold is to be adjusted from one iteration to another. In one embodiment, at will become apparent from the description herein further below, a current adjustment value by which a given metric-specific threshold can be adjusted for a next iteration may depend on a previous adjustment value by which the given metric-specific threshold has been adjusted for a previous iteration.

During the second iteration, the server 106 may be configured to employ the first metric-specific threshold 630 from the second candidate combination 660 for comparison against the first prediction values 622 and the adjusted second metric-specific threshold 642 from the second candidate combination 660 for comparison against the second prediction values 624.

For example, the server 106 may be configured to compare the first prediction value 612 for the validation object associated with the object-specific validation dataset 215 against the first metric-specific threshold 630, and in response, determine a predicted class 872. For example, if the first prediction value 612 is above the first metric-specific threshold 630, the server 106 may be configured to determine that the predicted class 872 is indicative of the first class otherwise, if the first prediction value 612 is below the first metric-specific threshold 630, the server 106 may be configured to determine that the predicted class 872 is indicative of the second class. Similarly, the server 106 may be configured to compare each one of the plurality of first prediction values 622 in order to generate a third plurality of predicted classes 874. It can be said that third predicted class data 870 is generated based on a comparison of the first prediction data 610 against the first metric-specific threshold 630.

In the same example, the server 106 may be configured to compare the second prediction value 614 for the validation object associated with the object-specific validation dataset 215 against the adjusted second metric-specific threshold 642, and in response, determine a predicted class 882. Similarly, the server 106 may be configured to compare each one of the plurality of second prediction values 624 in order to generate a fourth plurality of predicted classes 884. It can be said that fourth predicted class data 880 is generated based on a comparison of the second prediction data 620 against the adjusted second metric-specific threshold 642.

The server 106 may be configured to compare the third predicted class data 870 and the fourth predicted class data 880 against the label data 690 from the object-specific validation data 220. As such, the server 106 may be configured to perform a comparison of the third predicted class data 870 and the fourth predicted class data 880 against the label data 690 for evaluating classification performance of the first nested metric 412 and of the second nested metric 414 when used in combination with the first metric-specific threshold 630 and the adjusted second metric-specific threshold 642, respectively. For example, the server 106 may be configured to determine a second precision parameter 892 and a second recall parameter 894 for the first nested metric 412 and an other second precision parameter 896 and an other second recall parameter 898 for the second nested metric 414 when used in combination with the second candidate combination 660.

Therefore, it can be said that the server 106 may be configured to generate during the second iteration, the second precision parameters (the second precision parameter 892 and the other second precision parameter 896) and the second recall parameters (the second recall parameter 894 and the other second recall parameter 898) for the plurality of nested metrics 410 by comparing the ground-truth classes from the object-specific validation data 220 against the respective predicted classes of respective validation objects.

It should be noted that the server 106 may be configured to store an indication of the second candidate combination of metric-specific thresholds 660 in association with the second precision parameter 892 and the second recall parameter 894 for the first nested metric 412 and in association with the other second precision parameter 896 and the other second recall parameter 898 for the second nested metric 414.

The server 106 may be configured to perform a large number of iterations similarly to how the server 106 is configured to perform the first and the second iterations. In some embodiments, the server 106 may be configured to perform iterations of the iterative validation process until a given stopping criterion is met. For example, the server 106 may be configured to stop the iterative validation process until one or more precision parameters and/or one or more recall parameters for a given training iteration are above one or more pre-determined thresholds, as it will be discussed below.

As mentioned above, it is contemplated that the server 106 may choose a direction of adjustment for a given metric-specific threshold in a given candidate combination for generating a new (adjusted) candidate combination depending on a previous direction of adjustment of the given metric-specific threshold.

For example, let it be assumed that during a third iteration, the server 106 uses the second candidate combination 660 for generating a new (third) candidate combination. The server 106 may be configured to keep the adjusted second metric-specific threshold 642 unchanged in the third candidate combination, while having an adjusted first metric-specific threshold, instead of the first metric-specific threshold 630—that is, the third candidate combination may comprise the (new) adjusted first metric-specific threshold and the adjusted second metric-specific threshold 642. The server 106 may be configured to perform the third iteration of the iterative validation process using this third candidate combination similarly to what has been described above with regard to the first and/or second iteration.

In the same example, when the server 106 is configured to generate a new (fourth) candidate combination for a fourth iteration, the server 106 may determine to keep the adjusted first metric-specific threshold from the third candidate combination unchanged and to adjust the adjusted second metric-specific threshold 642. To that end, in some embodiments, the server 106 may access information indicative of a previous adjustment of a metric-specific threshold for the second nested metric 414. For example, the server 106 may be configured to retrieve a pervious value by which the server 106 previously adjusted the second metric-specific threshold 640 in order to generate the adjusted second metric-specific threshold 642. The previous value may have a sign (direction of adjustment) and a magnitude (magnitude of adjustment).

It is contemplated that the server 106 may be configured to determine a new value by which the server 106 is to adjust the adjusted second metric-specific threshold 642 for generating a re-adjusted second metric-specific threshold in the fourth candidate combination by determining a value that (i) has a different sign than the previous value (different direction of adjustment) and (ii) a smaller magnitude (smaller magnitude of adjustment). The server 106 may then be configured to perform the fourth iteration of the iterative validation process using this fourth candidate combination comprising the adjusted first metric-specific threshold and the re-adjusted second metric-specific threshold.

It is further contemplated that the server 106 is configured to select one of the plurality of candidate combinations of metric-specific thresholds (associated with respective iterations of the iterative validation process) by comparing the respective precision and recall parameters against respective parameter thresholds. It is contemplated that parameter thresholds may comprise a pre-determined precision threshold and/or a pre-determined recall threshold (e.g., determined by the operator of a respective online service).

In one embodiment, the server 106 may be configured to use the pre-determined precision threshold indicative of a minimum precision parameter that the operator finds useful for performing the binary classification of objects. In this embodiment, for the first iteration, the server 106 may be configured to compare the first precision parameter 692 and the other first precision parameter 696 against the pre-determined precision threshold. If both the first precision parameter 692 and the other first precision parameter 696 are above the pre-determined precision threshold, then the first candidate combination of metric-specific thresholds 650 is retained for further processing. If at least one of the first precision parameter 692 and the other first precision parameter 696 is below the pre-determined precision threshold, then the first candidate combination of metric-specific thresholds 650 is rejected from further processing. In this embodiment, for the second iteration, the server 106 may be configured to compare the second precision parameter 892 and the other second precision parameter 896 against the pre-determined precision threshold. If both the second precision parameter 892 and the other second precision parameter 896 are above the pre-determined precision threshold, then the second candidate combination of metric-specific thresholds 660 is retained for further processing. If at least one of the second precision parameter 892 and the other second precision parameter 896 is below the pre-determined precision threshold, then the second candidate combination of metric-specific thresholds 650 is rejected from further processing. In this embodiment, the server 106 may be configured to select a given one amongst the retained candidate combinations that is associated the highest recall parameters amongst recall parameters of other retained candidate combinations as the target combination of metric specific thresholds.

Additionally or alternatively, the server 106 may be configured to determine which of the plurality of candidate combinations are to be retained based on the pre-determined recall threshold (a minimum recall parameter the operator finds useful) and then a target combination can be selected by the server 106 as a given one of the retained candidate combinations that is associated with the highest precision parameters amongst precision parameters of other retrained candidate combinations.

Figure 7:
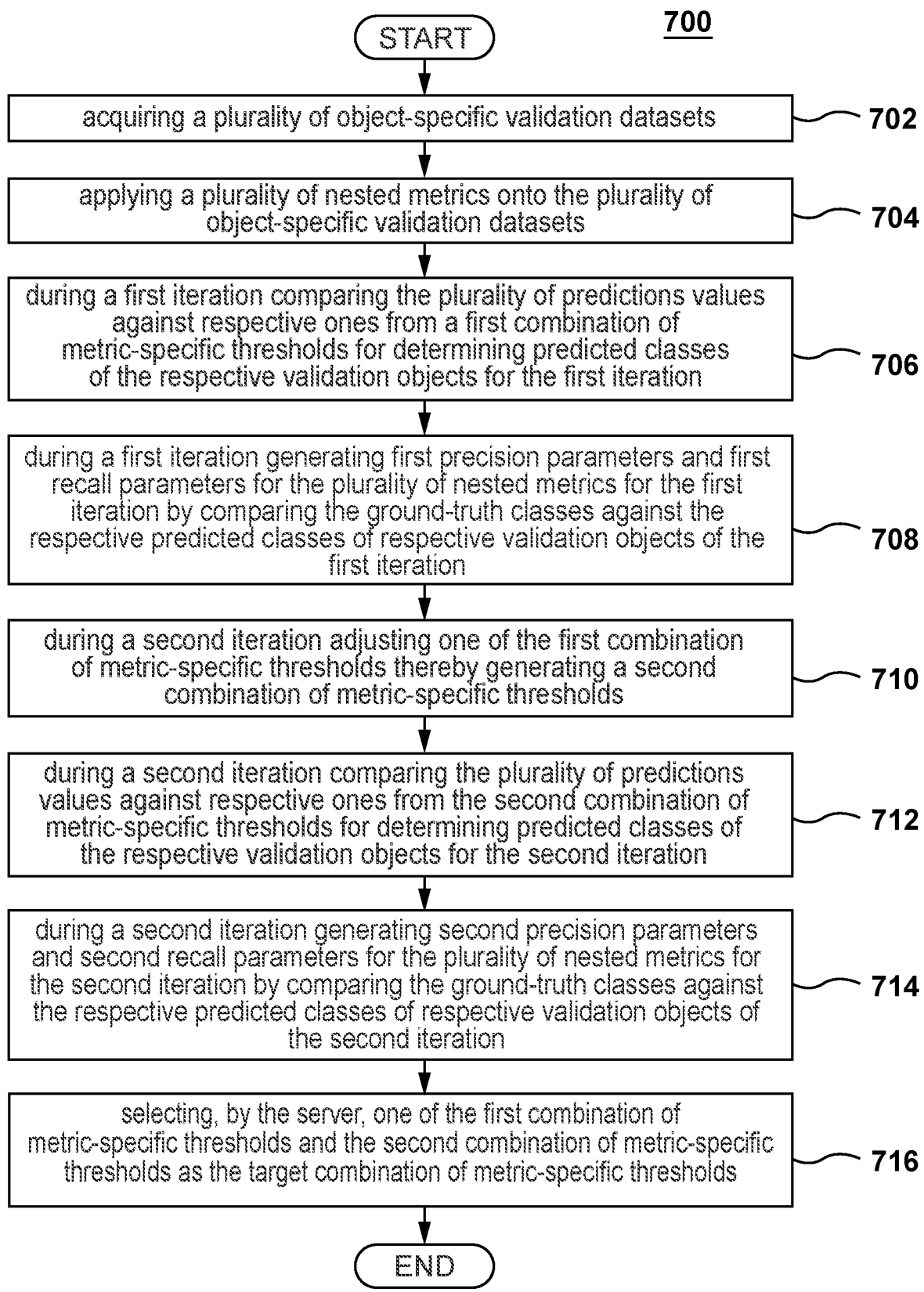
FIG. 7 depicts a block diagram of a method of determining the target combination of metric-specific thresholds, the method executable by the server of the system of FIG. 1, in accordance with embodiments of the present technology.

With reference to FIG. 7, there is depicted a scheme-block representation of a method 700 as contemplated in at least some non-limiting embodiments of the present technology. Various steps of the method 700 of determining a target combination of metric-specific thresholds to be used with a plurality of nested metrics for performing binary classification of a digital object will now be discussed in greater detail.

Step 702: Acquiring a Plurality of Object-Specific Validation Datasets

The method 700 begins at step 702 with the server 106 configured to acquire a plurality of object-specific validation datasets. For example, the server 106 may be configured to acquire the object-specific validation data 220 comprising the plurality of object-specific validation datasets. A given one of the plurality of object-specific validation datasets comprises an indication of a plurality of past object events associated with a respective validation object and a ground-truth class of the respective validation object being one of the first class and the second class.

In some embodiments, the object may be a given email and the first class is spam and the second class is non-spam. Alternatively, the object may be a given user of an e-market platform and the first class is a fraudulent class and the second class is a non-fraudulent class. Optionally, the object may be a given document and the first class is a relevant class and the second class is a non-relevant class.

Step 704: Applying a Plurality of Nested Metrics onto the Plurality of Object-Specific Validation Datasets The method 700 continues to step 704 with the server 106 configured to apply the plurality of nested metrics 410 onto the plurality of object-specific validation datasets, thereby generating a plurality of prediction values 625. A given prediction value is indicative of a respective probability of the respective validation object belonging to one of the first class and the second class.

In some embodiments, a first metric from the plurality of nested metrics may be based on a first type of object events, and a second metric from the plurality of nested metrics may be based on a second type of object events, and where the second type of object events occurs only if the first type of object events have occurred. In some embodiments, the second type of object events may be a subset of the first type of object events.

Step 706: During a First Iteration Comparing the Plurality of Predictions Values Against Respective Ones from a First Combination of Metric-Specific Thresholds for Determining Predicted Classes of the Respective Validation Objects for the First Iteration The method 700 continues to step 706 with the server 106 configured to, during a first iteration, compare the plurality of predictions values 625 against respective ones from the first combination of metric-specific thresholds 650 for determining predicted classes of the respective validation objects for the first iteration. For example, the server 106 may be configured to determine first predicted class data 670 and the second predicted class data 680.

Step 708: During a First Iteration Generating First Precision Parameters and First Recall Parameters for the Plurality of Nested Metrics for the First Iteration by Comparing the Ground-Truth Classes Against the Respective Predicted Classes of Respective Validation Objects of the First Iteration The method 700 continues to step 708 with the server 106 configured to generate first precision parameters and first recall parameters for the plurality of nested metrics 410 for the first iteration by comparing the ground-truth classes against the respective predicted classes of respective validation objects of the first iteration.

For example, with reference to FIG. 6, the server 106 may be configured to generate the first precision parameter 692 and the first recall parameter 695 for the first nested metric 412 and the first other precision parameter 696 and the first other recall parameter 698 for the second nested metric 414.

Step 710: During a Second Iteration Adjusting One of the First Combination of Metric-Specific Thresholds Thereby Generating a Second Combination of Metric-Specific Thresholds The method 700 continues to step 710 with the server 106 configured to, during a second iteration, adjust one of the first combination of metric-specific thresholds 650 thereby generating a second combination of metric-specific thresholds 660.

For example, the server 106 may be configured to adjust the metric-specific threshold 640 and thereby determine the adjusted metric-specific threshold 642. As a result, the second combination of metric-specific thresholds 660 comprises the adjusted metric-specific threshold 642 instead of the metric-specific threshold 640.

Step 712: During a Second Iteration Comparing the Plurality of Predictions Values Against Respective Ones from the Second Combination of Metric-Specific Thresholds for Determining Predicted Classes of the Respective Validation Objects for the Second Iteration The method 700 continues to step 712 with the server 106 configured to, during the second iteration, compare the plurality of predictions values 625 against respective ones from the second combination of metric-specific thresholds 660 for determining predicted classes of the respective validation objects for the second iteration. For example, the server 106 may be configured to determine the third predicted class data 870 and the fourth predicted class data 880.

Step 714: During a Second Iteration Generating Second Precision Parameters and Second Recall Parameters for the Plurality of Nested Metrics for the Second Iteration by Comparing the Ground-Truth Classes Against the Respective Predicted Classes of Respective Validation Objects of the Second Iteration The method 700 continues to step 714 with the server 106 configured to, during the second iteration, generate second precision parameters and second recall parameters for the plurality of nested metrics 410 for the second iteration by comparing the ground-truth classes against the respective predicted classes of respective validation objects of the second iteration.

As seen on FIG. 6, the server 106 may be configured to generate the second precision parameter 892 and the second recall parameter 894 for the first nested metric 412. The server 106 may be configured to generate the second other precision parameter 896 and the second other recall parameter 898 for the second nested metric 414.

Step 716: Selecting, by the Server, One of the First Combination of Metric-Specific Thresholds and the Second Combination of Metric-Specific Thresholds as the Target Combination of Metric-Specific Thresholds The method 700 continues to step 716 with the server 106 configured to select one of the first combination 650 and the second combination 660 as the target combination of metric-specific thresholds by comparing at least one of (i) the first precision parameters and the second precision parameters against a precision threshold, and (ii) the first recall parameters and the second recall parameters against a recall threshold. The target combination of metric-specific thresholds 450 is to be used with the plurality of nested metrics 410 in an in-use mode for performing binary classification of the digital object, such that in response to an in-use predicted value of at least one of the plurality of nested metrics 410 for the digital object being above a respective one of the target combination of metric-specific thresholds 450, determining the digital object to be of the first class.

It should be noted that in some embodiments, the target combination of metric-specific thresholds is selected simultaneously for the plurality of nested metrics during a single iteration.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining a target combination of metric-specific thresholds to be used with a plurality of nested metrics for performing binary classification of a digital object into a first class or a second class, the object being associated with past object events an indication of which is stored in a storage, the method executable by a server configured to access the storage, the method comprising:
   acquiring, by the server, a plurality of object-specific validation datasets, a given one of the plurality of object-specific validation datasets comprising an indication of a plurality of past object events associated with a respective validation object and a ground-truth class of the respective validation object being one of the first class and the second class;
   applying, by the server, a plurality of nested metrics onto the plurality of object-specific validation datasets, thereby generating a plurality of prediction values,
      a given prediction value being indicative of a respective probability of the respective validation object belonging to one of the first class and the second class;
   during a first iteration:
      comparing, by the server, the plurality of predictions values against respective ones from a first combination of metric-specific thresholds for determining predicted classes of the respective validation objects for the first iteration;
      generating, by the server, first precision parameters and first recall parameters for the plurality of nested metrics for the first iteration by comparing the ground-truth classes against the respective predicted classes of respective validation objects of the first iteration;
   during a second iteration:
      adjusting, by the server, one of the first combination of metric-specific thresholds thereby generating a second combination of metric-specific thresholds;
      comparing, by the server, the plurality of predictions values against respective ones from the second combination of metric-specific thresholds for determining predicted classes of the respective validation objects for the second iteration;
      generating, by the server, second precision parameters and second recall parameters for the plurality of nested metrics for the second iteration by comparing the ground-truth classes against the respective predicted classes of respective validation objects of the second iteration; and
   selecting, by the server, one of the first combination of metric-specific thresholds and the second combination of metric-specific thresholds as the target combination of metric-specific thresholds by:
      comparing at least one of (i) the first precision parameters and the second precision parameters against a precision threshold, and (ii) the first recall parameters and the second recall parameters against a recall threshold, and
      the target combination of metric-specific thresholds to be used with the plurality of nested metrics in an in-use mode for performing binary classification of the digital object,
         such that in response to an in-use predicted value of at least one of the plurality of nested metrics for the digital object being above a respective one of the target combination of metric-specific thresholds, determining the digital object to be of the first class.

2. The method of claim 1, wherein the method further comprises:
   performing, by the server, a plurality of iterations until at least one of (i) precision parameters for a given iteration are above the precision threshold, and (ii) recall parameters for the given iteration are above the recall threshold; and
   selecting, by the server, a given combination of metric-specific thresholds from the given iteration as the target combination of metric-specific thresholds.

3. The method of claim 1, wherein the method further comprises:
   during the in-use mode:
      acquiring, by the server, an object-specific dataset comprising an indication of a plurality of past object events associated with the object;
      applying, by the server, a plurality of nested metrics onto the object-specific dataset, thereby generating one or more prediction values indicative of a respective probability of the object belonging to one of the first class and the second class;
      comparing, by the server, the one or more prediction values against the respective ones from the target combination of metric-specific thresholds,
      in response to at least one of the one or more prediction values being above the respective one from the target combination of metric-specific thresholds, determining, by the server, the object to be of the first class; and in response to none of the one or more prediction values being above the respective one from the target combination of metric-specific thresholds, determining, by the server, the object to be of the second class.

4. The method of claim 1, wherein a first metric from the plurality of nested metrics is based on a first type of object events, and wherein a second metric from the plurality of nested metrics is based on a second type of object events, the second type of object events occurring only if the first type of object events have occurred.

5. The method of claim 4, wherein the second type of object events is a subset of the first type of object events.

6. The method of claim 1, wherein the target combination of metric-specific thresholds is selected simultaneously for the plurality of nested metrics during a single iteration.

7. The method of claim 1, wherein the object is a given email and the first class is spam and the second class is non-spam.

8. The method of claim 1, wherein the object is a given user of an e-market platform and the first class is a fraudulent class and the second class is a non-fraudulent class.

9. The method of claim 1, wherein the object is a given document and the first class is a relevant class and the second class is a non-relevant class.

10. A server for determining a target combination of metric-specific thresholds to be used with a plurality of nested metrics for performing binary classification of a digital object into a first class or a second class, the object being associated with past object events an indication of which is stored in a storage, the server configured to access the storage, the server being configured to:
   acquire a plurality of object-specific validation datasets, a given one of the plurality of object-specific validation datasets comprising an indication of a plurality of past object events associated with a respective validation object and a ground-truth class of the respective validation object being one of the first class and the second class;
   apply a plurality of nested metrics onto the plurality of object-specific validation datasets, thereby generating a plurality of prediction values,
      a given prediction value being indicative of a respective probability of the respective validation object belonging to one of the first class and the second class;
   during a first iteration:
      compare the plurality of predictions values against respective ones from a first combination of metric-specific thresholds for determining predicted classes of the respective validation objects for the first iteration;
      generate first precision parameters and first recall parameters for the plurality of nested metrics for the first iteration by comparing the ground-truth classes against the respective predicted classes of respective validation objects of the first iteration;
   during a second iteration:
      adjust one of the first combination of metric-specific thresholds thereby generating a second combination of metric-specific thresholds;
      compare the plurality of predictions values against respective ones from the second combination of metric-specific thresholds for determining predicted classes of the respective validation objects for the second iteration;
      generate second precision parameters and second recall parameters for the plurality of nested metrics for the second iteration by comparing the ground-truth classes against the respective predicted classes of respective validation objects of the second iteration; and
   select one of the first combination of metric-specific thresholds and the second combination of metric-specific thresholds as the target combination of metric-specific thresholds by:
      comparing at least one of (i) the first precision parameters and the second precision parameters against a precision threshold, and (ii) the first recall parameters and the second recall parameters against a recall threshold, and
      the target combination of metric-specific thresholds to be used with the plurality of nested metrics in an in-use mode for performing binary classification of the digital object,
         such that in response to an in-use predicted value of at least one of the plurality of nested metrics for the digital object being above a respective one of the target combination of metric-specific thresholds, determining the digital object to be of the first class.

11. The server of claim 10, wherein the server is further configured to:
   perform a plurality of iterations until at least one of (i) precision parameters for a given iteration are above the precision threshold, and (ii) recall parameters for the given iteration are above the recall threshold; and
   select a given combination of metric-specific thresholds from the given iteration as the target combination of metric-specific thresholds.

12. The server of claim 10, wherein the server is further configured to:
   during the in-use mode:
      acquire an object-specific dataset comprising an indication of a plurality of past object events associated with the object;
      apply a plurality of nested metrics onto the object-specific dataset, thereby generating one or more prediction values indicative of a respective probability of the object belonging to one of the first class and the second class;
      compare the one or more prediction values against the respective ones from the target combination of metric-specific thresholds,
      in response to at least one of the one or more prediction values being above the respective one from the target combination of metric-specific thresholds, determine the object to be of the first class; and
      in response to none of the one or more prediction values being above the respective one from the target combination of metric-specific thresholds, determine the object to be of the second class.

13. The server of claim 10, wherein a first metric from the plurality of nested metrics is based on a first type of object events, and wherein a second metric from the plurality of nested metrics is based on a second type of object events, the second type of object events occurring only if the first type of object events have occurred.

14. The server of claim 13, wherein the second type of object events is a subset of the first type of object events.

15. The server of claim 10, wherein the target combination of metric-specific thresholds is selected simultaneously for the plurality of nested metrics during a single iteration.

16. The server of claim 10, wherein the object is a given email and the first class is spam and the second class is non-spam.

17. The server of claim 10, wherein the object is a given user of an e-market platform and the first class is a fraudulent class and the second class is a non-fraudulent class.

18. The server of claim 10, wherein the object is a given document and the first class is a relevant class and the second class is a non-relevant class.

* * * * *